US006968563B2

(12) United States Patent
Nagai

(10) Patent No.: US 6,968,563 B2
(45) Date of Patent: Nov. 22, 2005

(54) OPTICAL HEAD

(75) Inventor: Koichi Nagai, Chigasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 216 days.

(21) Appl. No.: 10/205,627

(22) Filed: Jul. 26, 2002

(65) Prior Publication Data

US 2003/0021219 A1  Jan. 30, 2003

(30) Foreign Application Priority Data

Jul. 27, 2001 (JP) ............................ 2001-228125
May 21, 2002 (JP) ............................ 2002-146167

(51) Int. Cl.$^7$ ............................ G11B 7/09; G11B 7/08
(52) U.S. Cl. .................... 720/682; 720/683; 369/44.16
(58) Field of Search ................. 720/683, 681, 720/682; 369/44.22, 44.16, 112.04, 112.24

(56) References Cited

U.S. PATENT DOCUMENTS

| 5,721,723 | A | | 2/1998 | Uchimaru et al. |
| 5,930,224 | A | * | 7/1999 | Ikegame ..................... 720/699 |
| 6,130,789 | A | * | 10/2000 | Aarts et al. ................. 359/819 |
| 6,414,931 | B1 | * | 7/2002 | Maeda et al. .......... 369/112.24 |
| 6,728,179 | B1 | * | 4/2004 | Nakano et al. ............ 369/53.1 |

FOREIGN PATENT DOCUMENTS

| JP | 59-178632 | 10/1984 | |
| JP | 03-077109 | 4/1991 | |
| JP | 04-125693 | 4/1992 | |
| JP | 5-151609 | 6/1993 | |
| JP | 5-266511 | 10/1993 | |
| JP | 07-199027 | 8/1995 | |
| JP | 08-249690 | 9/1996 | |
| JP | 09-106557 | 4/1997 | |
| JP | 10-188301 | 7/1998 | |
| JP | 11110794 A | * 4/1999 | ........... G11B 7/135 |
| JP | 2001-028147 | 1/2001 | |
| JP | 2001-28147 | 1/2001 | |
| JP | 2001143289 A | * 5/2001 | ............ G11B 7/09 |

OTHER PUBLICATIONS

Japanese Office Action dated Feb. 1, 2005 for Appln. No. 2002-146167.

* cited by examiner

Primary Examiner—William J Klimowicz
(74) Attorney, Agent, or Firm—Pillsbury, Winthrop, Shaw, Pittman, LLP

(57) ABSTRACT

A relay lens driving device provided in an optical head moves a relay lens in the direction of an optical axis thereof to correct a spherical aberration that may be caused by an error in the thickness of a cover layer of an optical disk. The relay lens driving mechanism has a lens to correct spherical aberrations, a lens holder which holds the lens, a first parallel plate spring which supports the lens holder at one end thereof, an intermediate member attached to the other end of the first parallel plate spring, a second parallel plate spring arranged to extend from the intermediate member to the lens holder to support the intermediate member at one end thereof, and a fixing member which fixes the other end of the second parallel plate spring.

6 Claims, 14 Drawing Sheets

OPTICAL HEAD

CROSS-REFERENCE TO RELATED APPLICATIONS

This application is based upon and claims the benefit of priority from the prior Japanese Patent Applications No. 2001-228125, filed Jul. 27, 2001; and No. 2002-146167, filed May 21, 2002, the entire contents of both of which are incorporated herein by reference.

BACKGROUND OF THE INVENTION

1. Field of the Invention

The present invention relates to an optical head irradiating an optical disk with a light beam to record or reproduce information, particularly an optical head comprising a relay lens to correct spherical aberrations, and to an optical disk apparatus comprising such an optical head.

2. Description of the Related Art

In recent years, in the field of recording or reproduction using, for example, an optical disk as a recording medium, many attempts have been made to an optical disk recording and reproducing apparatus that carries out recording on and reproduction from a small-sized high-capacity optical disk in order to deal with high-definition still images or moving pictures. A technical method of increasing capacity is to reduce the diameter of a beam spot by reducing the wavelength of a laser beam emitted by an optical pickup apparatus and increasing the numerical aperture (NA) of an objective lens.

The optical disk is generally irradiated with a beam via a transparent optical disk substrate (a cover layer) that covers an information record surface of the disk. With increasing NA, coma is more likely to be caused by a variation in angle between the objective lens and the disk substrate. The causes of the variation in angle include a warp of the optical disk, inclination of a spindle motor that rotates the optical disk, and inclination of an objective lens driving mechanism mounted in the optical head. It is difficult to precisely adjust the angle to accommodate the increased NA, while allowing mass production of this optical disk. Coma resulting from the inclination occurs when a beam passes through the disk substrate, and can thus be lessened by reducing the thickness of the substrate to effect inclination. Accordingly, for an optical disk system using an objective lens with a large NA, an optical disk with a thinner substrate must be used to avoid inclination errors.

On the other hand, the objective lens is designed to form a beam spot with few spherical aberrations on the information record surface of the optical disk when the substrate of a specific optical thickness is used. Consequently, a spherical aberration may occur if the thickness of the substrate deviates from a designed optical thickness. Further, if as in a two-layer disk, two information record surfaces are irradiated with a laser beam from the same direction (compared to a double-sided disk on which recording and reproduction are carried out from different directions), the optical thickness of the transparent layer substrate always differs between the two layers. A spherical aberration caused by an error in the substrate thickness substantially increases consistently with NA. For a lens with a large NA such as 0.85, it is difficult to neglect the effects of an error in the optical thickness of an optical disk manufactured by a normal method.

The term "optical thickness" as used herein refers to a value determined by the thickness and refractive index of an optical disk substrate through which light is transmitted. Optical disk substrates having different thicknesses have an equal optical thickness if beam spots obtained by transmitting light through these substrates have an equal level of spherical aberration. Even if the substrate consists of a plurality of layers, its optical thickness is determined by the thicknesses and refractive indices of these layers.

Jpn. Pat. Appln. KOKAI Publication No. 5-151609 discloses various methods of correcting spherical aberrations caused by a variation in thickness of the optical disk substrate. One of these methods uses what is called a relay lens composed of a convex lens and a concave lens. The relay lens composed of the convex and concave lenses is arranged in front of a position where light emitted by a laser diode is incident on the objective lens. A beam incident on the optical disk through the objective lens has its spherical aberrations varied by varying the position of either the convex or concave lens in the direction of an optical axis. This cancels spherical aberrations that may occur in the optical disk to generate a beam spot with few aberrations on the optical disk. This publication uses a VCM (Voice Coil Motor) as a driving mechanism for the objective lens but does not disclose its structure or a control method therefor.

Jpn. Pat. Appln. KOKAI Publication No. 5-266511 discloses another method somewhat in detail. The method disclosed in this publication uses as relay lens driving means a method of attaching a rack to a relay lens to be moved so that a pinion is rotated to move the lens. This publication also discloses a method of using a measuring instrument provided in a recording and reproducing apparatus to measure a substrate thickness (cover layer thickness), or reading the thickness data recorded in the disk, and setting the position of the relay lens in accordance with the thickness.

Jpn. Pat. Appln. KOKAI Publication No. 2001-28147 also discloses another method somewhat in detail. In this example, the interval between a first and second lenses of the relay lens can be changed using voice coil motors. These voice coil motors are designed so as to vary the interval between the lenses linearly with input currents. To obtain a lens interval suitable for recording in or reproduction from the first or second layer, currents having the same magnitude and flowing in the opposite directions may be allowed to flow through the respective coils.

However, the above described conventional techniques have a plurality of problems.

Jpn. Pat. Appln. KOKAI Publication No. 5-151609 does not provide a detailed description of a driving mechanism using a VCM, as described previously. However, a lens moving mechanism to correct spherical aberrations cannot exhibit sufficient performance with a general simple VCM. Therefore, the technique disclosed in this publication does not allow a practical optical head to be manufactured.

Jpn. Pat. Appln. KOKAI Publication No. 5-266511 discloses an example in which the rack and pinion are used as a relay lens movement device. An optical disk apparatus with an optical head mounted therein is used in a portable computer, a music reproducing apparatus, or the like, and must thus be very small in size. However, with the configuration according to this publication, which has a large number of components including power transmission mechanisms such as a rotary motor and the rack and pinion which convert rotational movement into linear movement, it is difficult to provide a small-sized optical head.

The lens moving mechanism to correct spherical aberrations must move the lens only in the direction of the optical axis. If the lens is inclined or its optical axis deviates from its correct position as the lens is moved, an aberration may occur to hinder the appropriate beam spot from being obtained. Furthermore, if the optical axis deviates from its correct position, the direction of a beam traveling from the relay lens to the objective lens may change. Then, disadvantageously, the position of the beam spot may change. If the position of the beam spot shifts in the radial direction of the disk, then a tracking servo mechanism of an optical drive device moves an objective lens actuator in a tracking direction to prevent the beam spot from deviating from the proper track. However, of course, the acceleration and movement of the beam spot have upper limits. Accordingly, the inclination of the relay lens and the positional deviation of the optical shift must be minimized. None of the conventional techniques deal with this point. Jpn. Pat. Appln. KOKAI Publication No. 5-266511 also fails to describe a mechanism that provides such a function.

Actually, it is expected to be difficult to design a lens moving mechanism using a rack and a pinion, so as to prevent these problems. For example, a typical rack and pinion mechanism involves backlash and is thus readily affected by vibration or a shock. An optical disk apparatus includes vibration inducing components such as a spindle motor rotating the disk and an objective lens actuator even if it is of an installed type instead of a portable type. Further, equipment such as computer in which an optical disk apparatus is mounted often includes a source of vibration such as a fan. With backlash, the apparatus is prone to be affected such vibration. That is, it is difficult to control the position of the relay lens using the rack and pinion mechanism while information is being recorded on or reproduced from the optical disk.

In the VCM disclosed in Jpn. Pat. Appln. KOKAI Publication No. 2001-28147, the opposite sides of the second lens are supported by plate springs. It is difficult for such a center impeller support structure to establish linear moving directions. Thus, this structure is available only for very short strokes. Accordingly, a sufficient spherical aberration correcting capability is not ensured unless the focal lengths of the first and second lenses are short. In this case, however, the lenses may have to be aspherical, or the ranges of possible inclination of the lens or of permissible errors in eccentricity may be narrowed. As a result, the apparatus cannot be easily assembled. Furthermore, such a support structure is not rigid enough to support the lenses so as to prevent its optical axis from being inclined. Consequently, the lenses may be rotated by a possible vibration or shock, thereby increasing optical aberrations. Further, since the lens interval is controlled on the basis of the amount of current conducted, the effects of a vibration or shock cannot be eliminated. As a result, the lenses may also be moved in the direction of the optical axis by the vibration or the like. This publication cites Jpn. Pat. Appln. KOKAI Publication No. 10-188301 as a conventional example. According to Jpn. Pat. Appln. KOKAI Publication No. 10-188301, spherical aberrations are corrected by varying the interval between two objective lenses using a VCM. With this method, however, after the appropriate current required to correct the interval has been determined, it is maintained to retain the interval. Accordingly, the effects of disturbances cannot be eliminated.

As described above, in a conventional optical head having lenses mounted therein and which can be moved to compensate for spherical aberrations, the proper lens positions cannot be retained. This results in many optical aberrations and makes it difficult to stably control the optical head.

Further, the optical head has an objective lens driving device mounted therein as a lens moving mechanism. Suppression of the positional deviation of the optical axis is not considered for the objective lens driving device because the objective lenses are originally designed to shift the optical axes from a beam for a tracking operation. Furthermore, an objective lens actuator is designed mainly to allow a beam spot to dynamically follow movement of the disk such as decentering or side runout thereof so as to follow frequency components of as low as several kHz. However, a relay lens driving mechanism is designed mainly to correct a spherical aberration caused by a difference between layers of a multilayered optical disk as well as a difference in optical thickness between the transparent substrates of disks; the spherical aberration and thickness difference are not varied by rotation of the disk. A variation in optical thickness of the transparent substrate on the disk surface, which may have to be followed, is small. Consequently, the relay lens driving mechanism mainly perform DC operations and requires a control band of only about several hundred Hz at the most. Thus, the conventional moving devices determine the lens positions using a fixed current or use a mechanism such as a rack and pinion which is not capable of fast reciprocation. Consequently, it is unreasonable to use the objective lens driving apparatus as a relay lens driving mechanism.

Further, with the above described conventional techniques, the relay lens is coaxially arranged on the optical axis of the objective lens, thereby disadvantageously increasing the thickness of the optical head. An optical disk drive with an optical head mounted therein must be thin if it is used as a storage device for a computer, notably a portable computer. Thus, the optical head must not be thick. Obviously, the above described conventional optical heads are thicker than an optical head without any general relay lenses by an amount equal to the thickness of the relay lens. Moreover, even if a mirror is interposed between the objective lens and the relay lens to bend the optical axes through 90°, the driving mechanism used in the conventional examples makes it difficult to reduce the thickness of the optical head.

BRIEF SUMMARY OF THE INVENTION

The present invention is provided to solve the above problems. It is an object of the present invention to provide an optical head comprising a relay lens driving mechanism which has a relay lens used to correct spherical aberrations, which precisely moves the relay lens, and which is unlikely to be affected by a vibration or shock.

To accomplish this object, according to a first aspect of the invention, an optical head comprises a lens to correct spherical aberrations; a lens holder holding the lens; a first parallel plate spring supporting the lens holder at one end thereof; an intermediate member attached to the other end of the first parallel plate spring; a second parallel plate spring arranged to extend from the intermediate member to the lens holder to support the intermediate member at one end thereof; and a fixing member fixeing the other end of the second parallel plate spring.

This configuration allows a relay lens to be moved only in the direction of an optical axis thereof as the lens holder is moved. Consequently, the optical axis of the lens is prevented from deviating from its correct position.

Further, according to another aspect of the invention, an optical head comprises a lens to correct spherical aberrations; a lens holder holding the lens; a guide rail extending parallel with an optical axis of the lens; a rail receiving section provided in the lens holder to receive the guide rail; a coil secured to the lens holder and having a winding axis extending perpendicularly to the guide rail; a permanent magnet provided opposite the coil; and a pressing section pressing the rail receiving section against the guide rail.

The winding axis for the coil is perpendicular to the optical axis, thereby enabling the optical head apparatus to be miniaturized. The lens is supported by the guide rail, thereby increasing supporting rigidity. The rail receiving section is pressed against the guide rail by the pressing section, thereby preventing the lens from inclined by a shock or vibration.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

The present invention will be described below with reference to the drawings.

Figure 1:
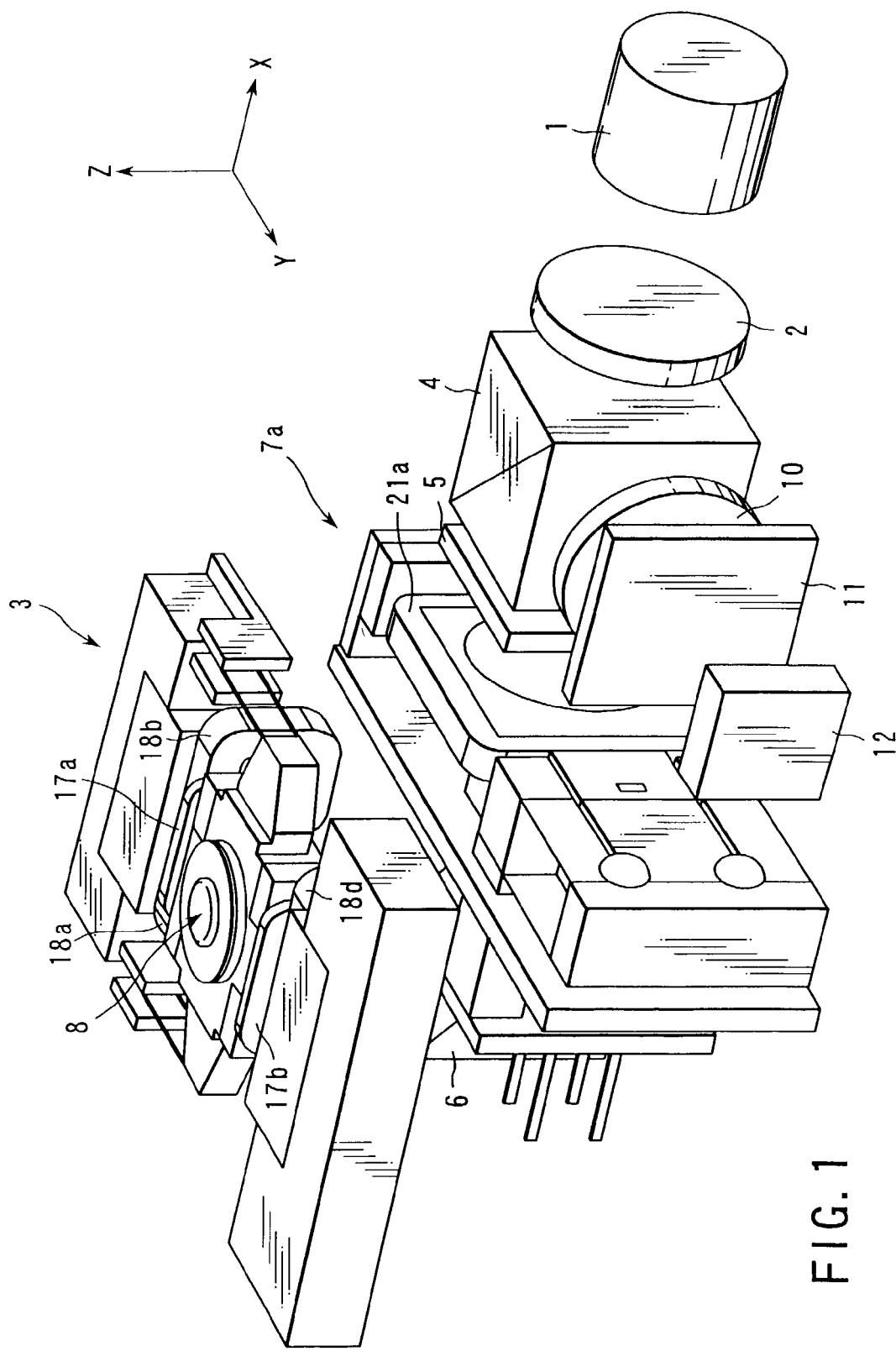
FIG. 1 is a perspective view showing the structure of a main part of an optical head according to a first embodiment of the present invention.
Figure 2:
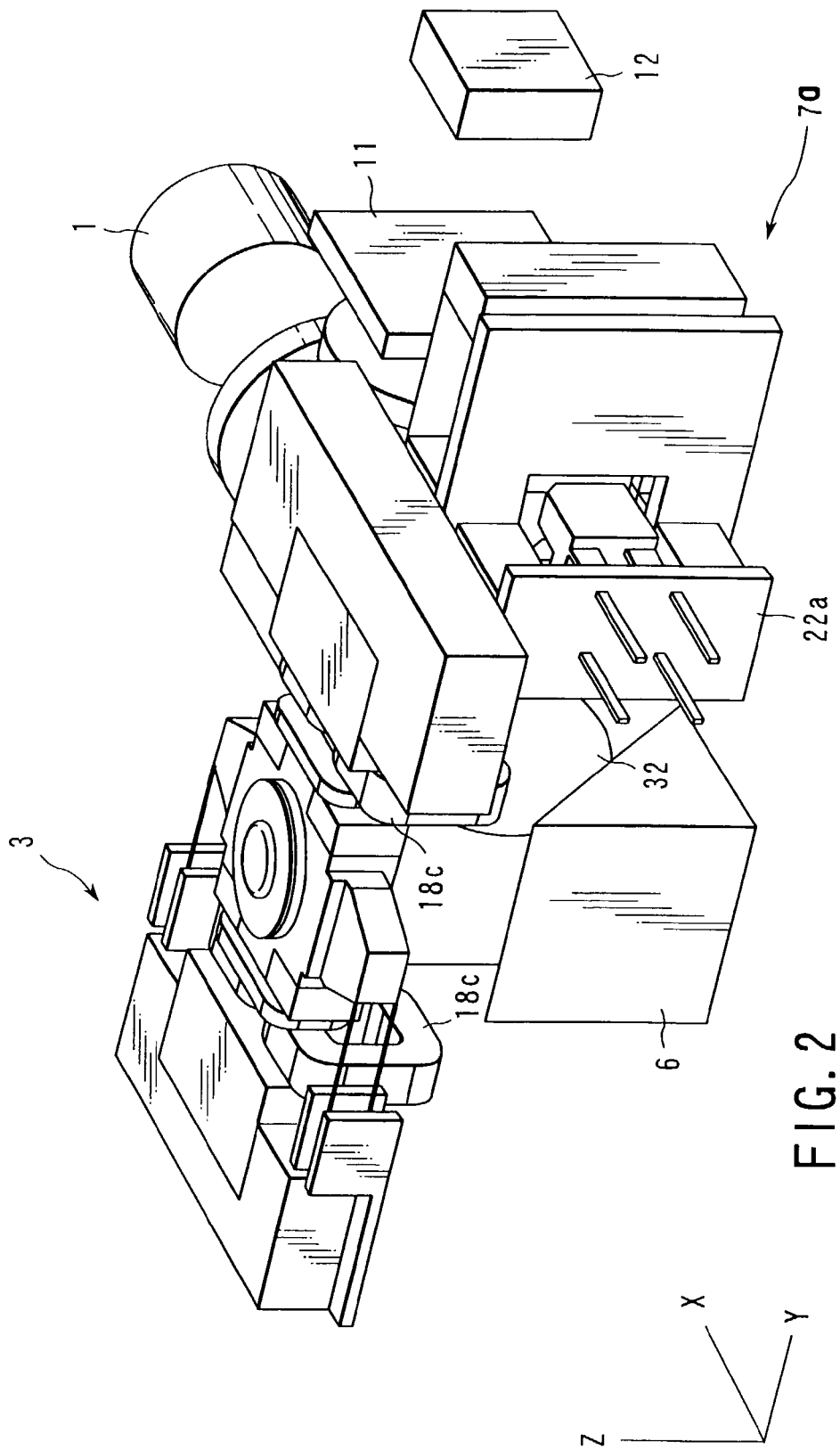
FIG. 2 is another perspective view showing the structure of the main part of the optical head according to the first embodiment of the present invention.
Figure 3:
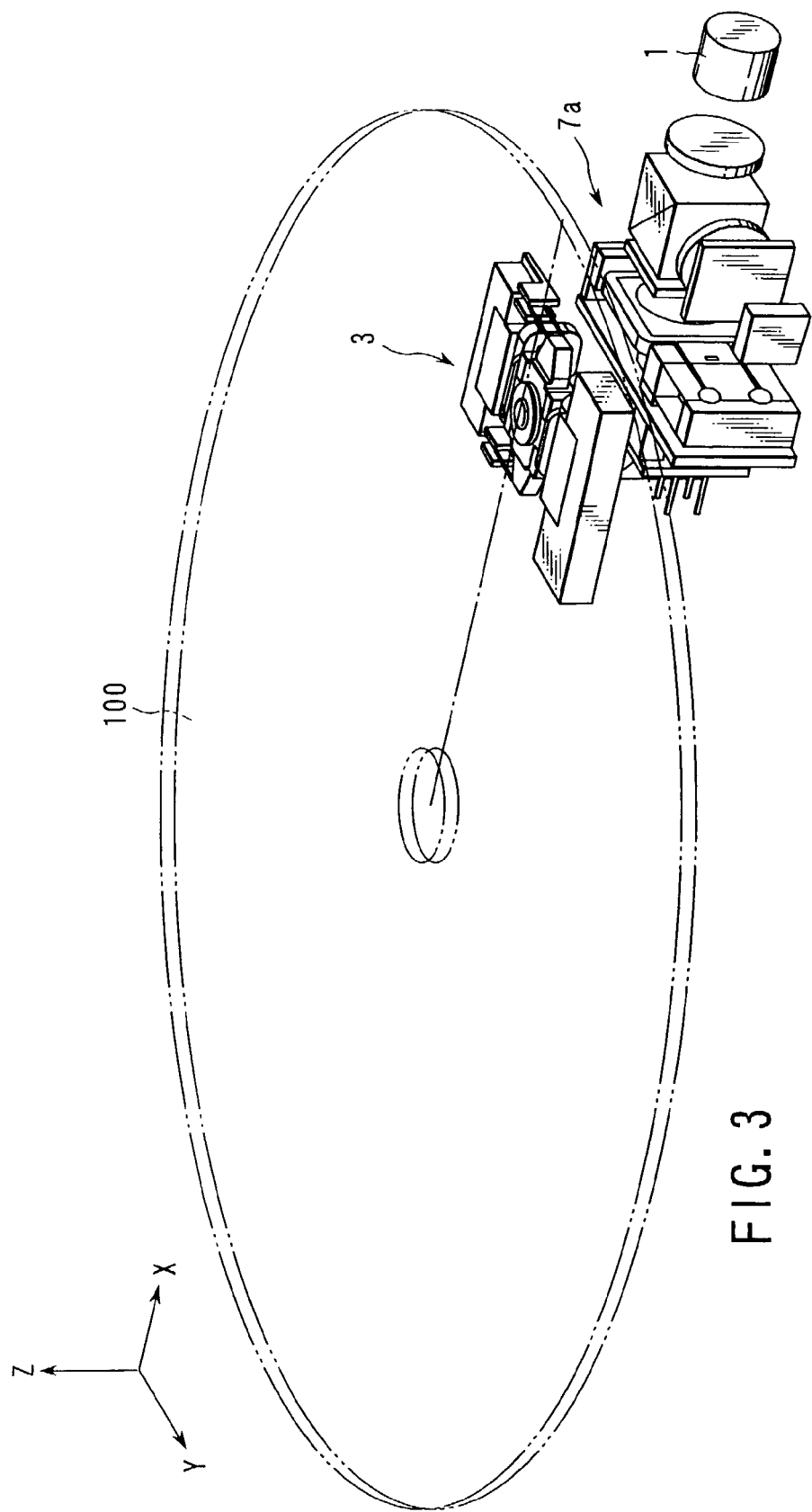
FIG. 3 is a perspective view showing the positional relationship between the optical head and an optical disk in FIG. 1.

FIGS. 1 and 2 are perspective views showing the structure of a main part of an optical head according to a first embodiment of the present invention. FIG. 3 is a perspective view showing the positional relationship between the optical head and an optical disk in FIGS. 1 and 2.

In FIG. 3, an optical disk 100 is a reproduction-only disk or recordable disk such as a phase-changing disk and a photomagnetic disk. In FIGS. 1 and 2, a light beam emitted by a light source 1 that irradiates an optical disk 100 with the light beam is collimated by a collimator lens 2. The beam is then incident on a beam splitter 4 and subsequently passes through a quarter wavelength plate 5. (A beam shaping prism that changes the shape of the light beam may be interposed between the collimator lens 2 and the beam splitter 4.) Then, the light beam propagates through a relay lens system in a relay lens driving mechanism 7a according to this embodiment. The beam then has its orientation changed by 90° by a mirror 6 and then impinges on an objective lens 8. The relay lens driving mechanism 7a moves a relay lens in the direction of its optical axis, the relay lens correcting spherical aberrations that may occur if there is an error in thickness of a cover layer of a disk. In this case, the objective lens 8 is composed of a combination of two lenses and has a high NA of about 0.85. An objective lens driving device 3 supports the objective lens 8 so that the lens 8 can be moved in the direction of its optical axis and in a radial direction of the disk. The light emitted from the objective lens 8 passes through the cover layer of the optical disk 100 and forms a beam spot on a desired reflection surface.

Figure 4:
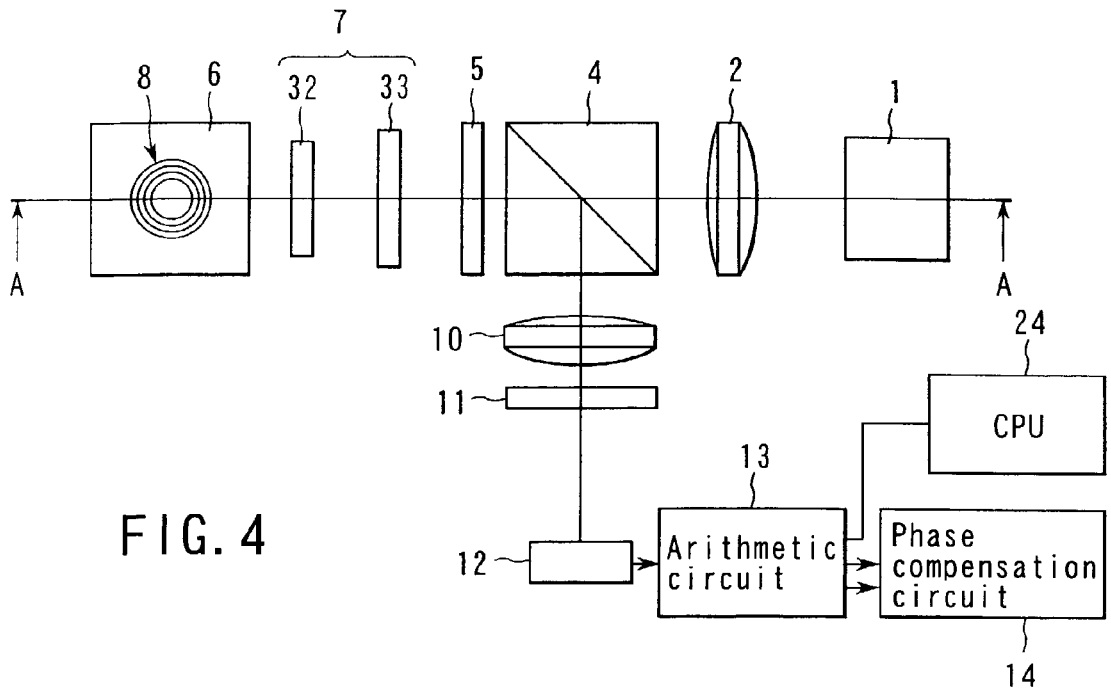
FIG. 4 is a schematic diagram showing the configuration of the optical head in FIG. 1.

Reflected light from the disk 100 passes through the objective lens 8 and is then reflected by the mirror 6. The light then propagates through the relay lens system and the quarter wavelength plate 5 and impinges on the beam splitter 4. Then, the light is reflected by the beam splitter 4 and condensed by a convex lens 10. Then, the light beam passes through a focus error signal generating element 11 and is applied to a photodetector 12. The focus error signal generating element 11 may be based on any method that can realize a focus error signal. For example, for an astigmatism method, the focus error signal generating element 11 is a cylindrical lens. An output from the photodetector 12 is input to an arithmetic circuit 13 as shown in FIG. 4. The arithmetic circuit 13 outputs an information reproduction signal, a focus error signal, and a tracking error signal. The focus error signal and the tracking error signal have their phases compensated for by a phase compensation circuit 14. On the basis of a signal resulting from the phase compensation, actuator drivers 15 and 16 in FIG. 5 conduct currents through coils 17 and 18 of the objective lens driving device 3. This controls the positions of the objective lens 8 in the direction of the optical axis and in the radial direction.

Figure 5:
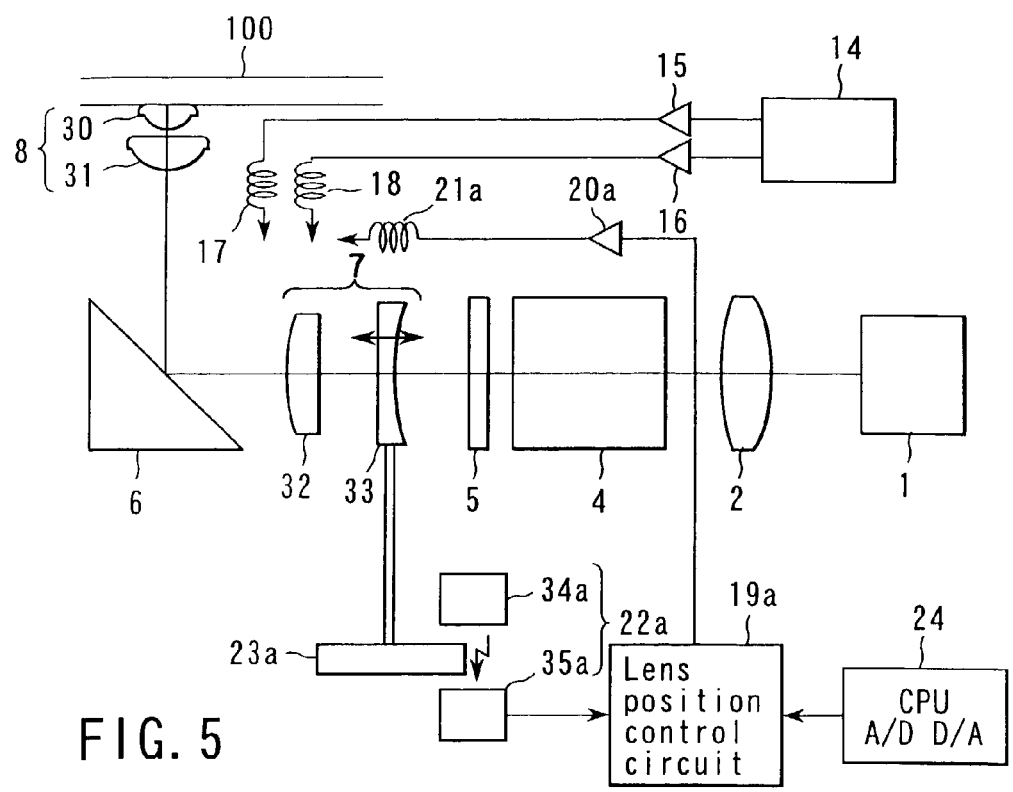
FIG. 5 is a schematic diagram showing the configuration and operation of the optical head in FIG. 1.

The relay lens system 7 shown in FIG. 5 is used to correct a spherical aberration that may be caused by an error in the thickness of a cover layer of the disk 100. At least either a lens 32 or a lens 33 (in this embodiment, 33) is moved in the direction of its optical axis to cause a spherical aberration in the relay lens system 7 so as to correct a spherical aberration caused by an error in the thickness of the cover layer of the disk 100. This operation can be controlled using the method disclosed in Jpn. Pat. Appln. KOKAI Publication No. 10-18830. However, this embodiment is provided with a position detecting device 22a that detects the position of the relay lens 33. In this case, the position detecting device 22a is a photointerrupter composed of a light emitting diode 34a and a photodetector 35a. The position of the relay lens 33 can be detected by allowing a baffle 23a operating integrally with the relay lens 33 to vary the quantity of light traveling from the light emitting diode 34a into the photodetector 35a, depending on the position. Then, an output from the photodetector 35a is input to a lens position control circuit 19a. The lens position control circuit 19a outputs a signal to a drive circuit 20a so as to place the relay lens at a specified position. The drive circuit 20a conducts a current through a coil 21a of the relay lens driving mechanism 7a. Thus, in the present apparatus, position control is executed on the basis of feedback control.

A number of methods are available for determining the position of the relay lens 33. For example, the following method can be used. A CPU 24 provided with A/D and D/A causes the relay lens position control circuit 19a to gradually moves the position of the relay lens 33 to the extent that a spherical aberration in the expected substrate thickness can be corrected. Then, a position of the lens 33 at which a reproduction information signal has the largest amplitude is detected. Subsequently, the corresponding value is continuously output to the relay lens position control circuit 19a. In this manner, position control is executed on the basis of feedback control instead of open control as in the prior art. Accordingly, the position of the relay lens is not affected by a vibration or shock, thereby precisely achieving detection of the maximum value of the reproduction information signal and the subsequent retention of the lens position. Consequently, the error in the thickness of cover layer of the disk can be compensated and a larger-capacity optical disk apparatus is provided.

Figure 6:
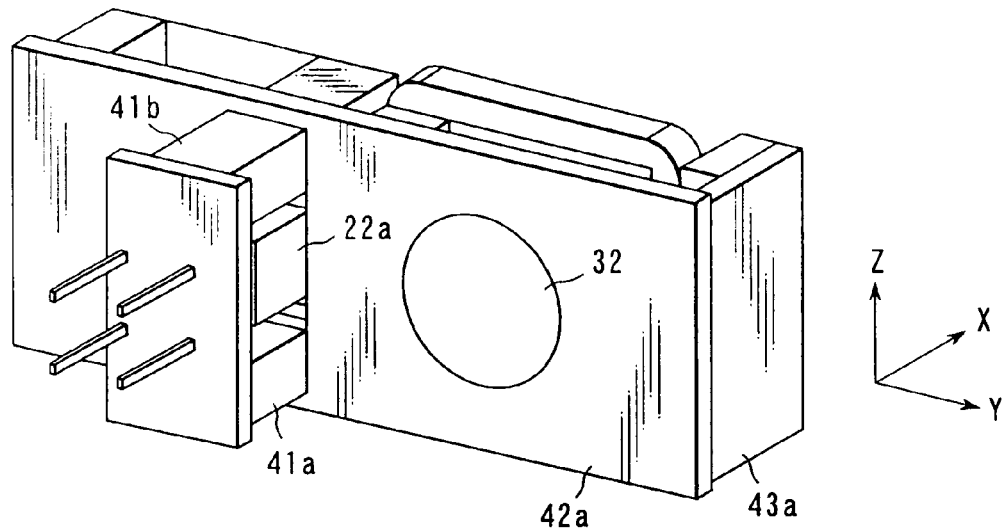
FIG. 6 is a perspective view showing a relay lens driving mechanism according to the first embodiment of the present invention.
Figure 8:
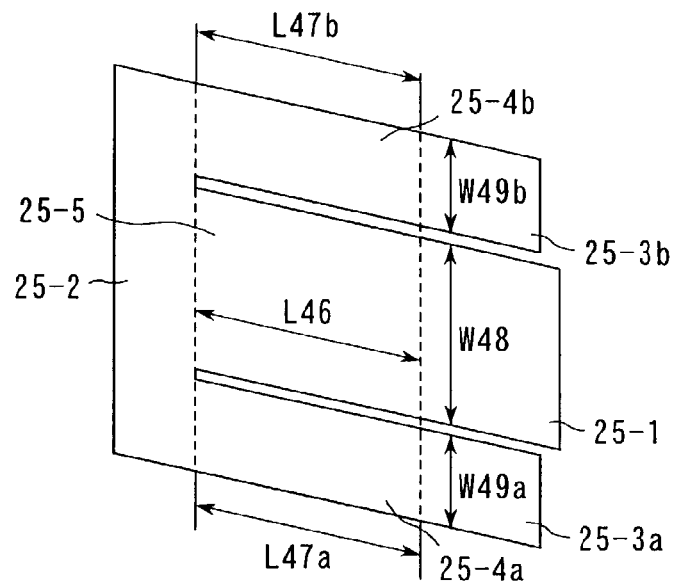
FIG. 8 is a perspective view showing plate springs used in the relay lens driving mechanism according to the first embodiment of the present invention.

Next, the relay lens driving mechanism 7a, mounted in the optical head of this embodiment, will be described in detail. In this case, of the two lenses constituting the relay lens system 7, the lens 32 is fixed, whereas the lens 33 is movable. As shown in FIG. 6, the lens 32 is mounted in a base 42a. A lens holder 27a has the coil 21a mounted thereon in a direction in which the coil is wound around an optical axis of the lens 33. The lens holder 27a is supported by two parallel plate springs 25a and 25b. While the plate springs are not flexed, their normals are parallel with the optical axis of the lens 33. As shown in FIG. 8, the plate springs 25a and 25b are fixed to the lens holder 27a in their areas 25-1. Areas 25-2 of the plate springs 25a and 25b are joined together by an intermediate joining member 28. Areas 25-3a and 25-3b are fixed by blocks 37a, 37b, 45a, and 45b so as not move relative to the base 42a. Consequently, in the plate springs 25a and 25b, it is areas 25-4a and 25-4b that actually function as plate springs. The plate springs 25a and 25b have a uniform thickness. The respective areas have widths W48, W49a, and W49b having the following relationship:

$$W48/2 = W49a = W49b$$

Further, the lengths L46, L47a, and L47b of the respective areas are equal.

Figure 7:
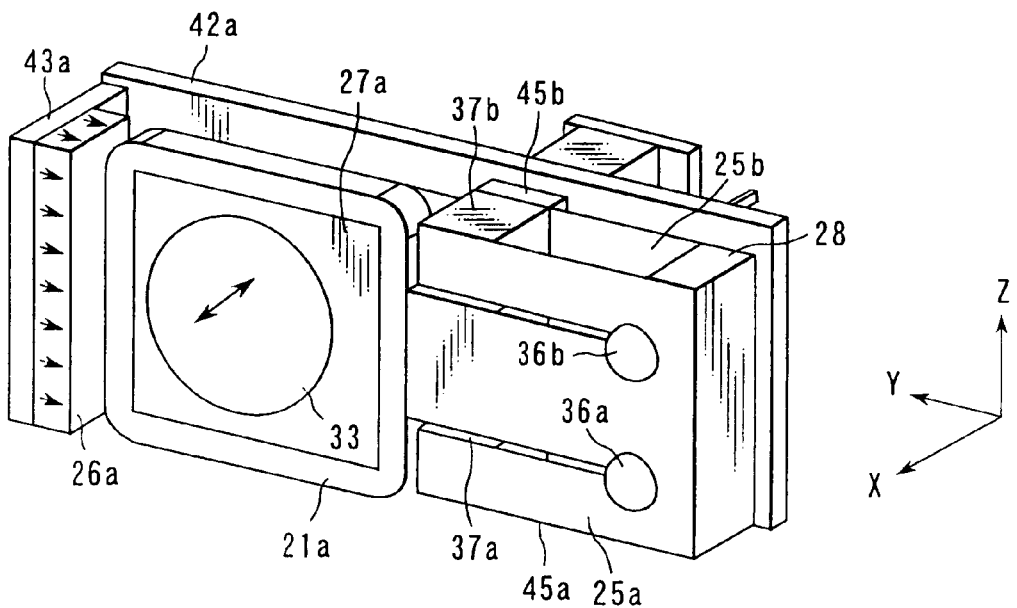
FIG. 7 is another perspective view showing the relay lens driving mechanism according to the first embodiment of the present invention.

As shown in FIG. 7, a permanent magnet 26a is placed opposite the plate springs of the relay lens driving coil 27a so as to be slightly separate from the coil 21a. The permanent magnet 26a is mounted on a yoke 43a consisting of a ferromagnetic material such as a steel plate. The yoke 43a is attached to the base 42a. Accordingly, the permanent magnet 26a is fixed to the base 42a. The permanent magnet 26a is magnetized so that magnetic fluxes emitted by the permanent magnet cross the coil 21a as shown by the arrows in FIG. 7.

Description will be given of the operation of the relay lens driving mechanism configured as described above. In FIG. 7, when a current is conducted through the coil 21a, it passes through a magnetic field generated by the permanent magnet 26a. Thus, Lorentz force is generated in the coil 21a. Then, force is exerted on the lens holder 27a in the direction of the optical axis of the lens 33. Since the lens holder 27a is supported by the plate springs 25a and 25b, the Lorentz force flexes the plate springs 25a and 25b to move the lens holder 27a in the direction of the optical axis. In this case, the plate springs 25a and 25b are assembled together so as to always lie parallel with each other. Accordingly, even when the lens holder 27a is moved in the direction of the optical axis, the lens 33 is not inclined. Further, the rigidity of the lens holder 27a in a vertical direction (Z direction) is high because of the high in-plane rigidity of the plate springs, which support the lens holder. Consequently, the lens 33 is prevented from moving in the vertical direction. Furthermore, the parallel plate spring arrangement has its length reduced in a direction (in this case, a Y direction) perpendicular to that in which the springs are flexed. A value for this reduction cannot be calculated using a simple formula for material dynamics. However, even when the plate springs are flexed, their length remains unchanged. Thus, reasonably, the decrease in length in the Y direction is understood on the basis of the knowledge of general material dynamics. This amount of contraction can be calculated taking structural non-linearity into consideration. That is, when the lens holder 27a is displaced in an X direction to bend the plate springs 25a and 25b, two Y direction distances are reduced: a Y direction distance from the junction between the plate springs and the lens holder 27a to the intermediate joining member 28 and a Y direction distance from the intermediate joining member 28 to the fixing members 37a and 37b.

The dimensions of the plate springs 25a and 25b are as described above. Thus, in FIG. 8, the flexural rigidity of each of the areas 25-4a and 25-4b in the X direction is half of that of the area 25-5 in the X direction. The lens holder 27a is supported by one end of the area 25-5 of each plate spring. The other end of the area 25-5 of the plate spring is joined to the intermediate joining member 28. Furthermore, the intermediate joining member 28 is supported at the same position in the Y direction by the areas 25-4a and 25-4b of the plate springs. Thus, when the lens holder 27a is displaced by, for example, a distance x1 in the X direction, the intermediate joining member 28 is displaced by a distance x1/2. This reduces both the distance from the junction between the plate springs and the lens holder 27a to the intermediate joining member 28 and the distance from the intermediate joining member 28 to the fixing members 37a and 37b, by the same distance y1. That is, the displacement of the intermediate joining member 28 in the Y direction relative to the fixing members 37a and 37b is as large as the displacement of the lens holder 27a in the Y direction relative to the intermediate joining member 28, but is directionally opposite thereto. Consequently, although the intermediate joining member 28 moves the distance y1 in the Y direction, the lens holder 27a is not displaced in the Y direction.

In the relay lens driving mechanism configures as described above, even when an attempt is made to move the lens 33, it is displaced only in the direction of its optical axis. Thus, spherical aberrations can be appropriately corrected. Further, the lens is supported by the two parallel plate springs, so that the lens 33 is rigid in a direction in which it may fall down. As a result, the lens is not inclined even with a shock or vibration.

Preferably, the plate springs with reduced rigidity in the X direction require a smaller current required to displace and hold the lens 33 in the direction of its optical axis, thereby reducing power consumption. However, reduced rigidity in the directions other than the moving direction may result in inclination or the like. Thus, the dimensions of the plate springs 25a and 25b must be determined considering the balance of the rigidities of the respective parts.

Further, in this embodiment, the force generated in the coil 21a concentrates on the left side thereof in FIG. 7. In contrast, the center of gravity of a movable part lies to the right of the area in which the force is generated. Thus, the force generation point deviates from the center of gravity of the movable part, so that moment force around a Z axis is generated in the movable part. Accordingly, intense vibration occurs and cannot be easily controlled if the frequency of an AC component of driving force is equal or close to the resonant frequency of the movable part around the Z axis. The resonant frequency can be set in a kHz order using a typical design method and material. As described previously, a frequency of about several hundred Hz is sufficient for a control band of the relay lens driving mechanism and is sufficiently lower than the frequency of rotation vibration around a Z axis. Accordingly, this resonance around the Z axis creates no problems. Further, the vibration can be suppressed to some degree using damping members, described later. If the control band is composed of high frequencies, the center of gravity must coincide with the point of action of force. However, the control band of the relay lens driving mechanism is composed of low frequencies, thus enabling design in which the center of gravity deviates from the point of action of force.

As described above, in this configuration, the center of gravity deviates from the point of action of force. Accordingly, the relay lens driving mechanism 7a in this embodiment can be constructed to have a small height in the Z direction. That is, the height in the Z direction is determined by only the diameter of the lens 33 and the thickness of the coil 21a. Consequently, the height in the Z direction can be reduced by avoiding arranging the permanent magnet and other elements in the Z direction. Furthermore, only one magnet is provided and this embodiment thus uses the minimum required arrangements to generate Lorentz force. Hence, advantageously, the number of parts required is small and manufacture costs are low. If the center of gravity and the point of action of force are arranged closer to each other, permanent magnets must be arranged substantially symmetrically with respect to the objective lens. However, a support section composed of the plate springs 25a and 25b and others is provided in the right of FIG. 7. Accordingly, the permanent magnets must be arranged above and below the coil 21a, thereby making it impossible to reduce the thickness of the apparatus.

Furthermore, the joining member 28 is arranged midway between the plate springs 25a and 25b. This may cause resonance in the X direction. Resonance may also occur which has a mode in which the movable part rotates around a Y axis. The rotation vibration around the Y axis is designed to be symmetric with respect to the Z direction. Accordingly, this vibration is in principle not induced by excitation but may be caused by a manufacture error. Damping members can be used to suppress these resonant vibrations to the level at which they create no problems. For example, a laminate structure may be provided in which each plate spring is sandwiched between damping members. In this embodiment, vibration is suppressed by applying gel materials 36a and 36b to the neighborhoods of the intermediate-joining-member-28-side roots of the areas between the area 25-5 of the plate spring and the areas 25-4a and 25-4b thereof, respectively.

Figure 9:
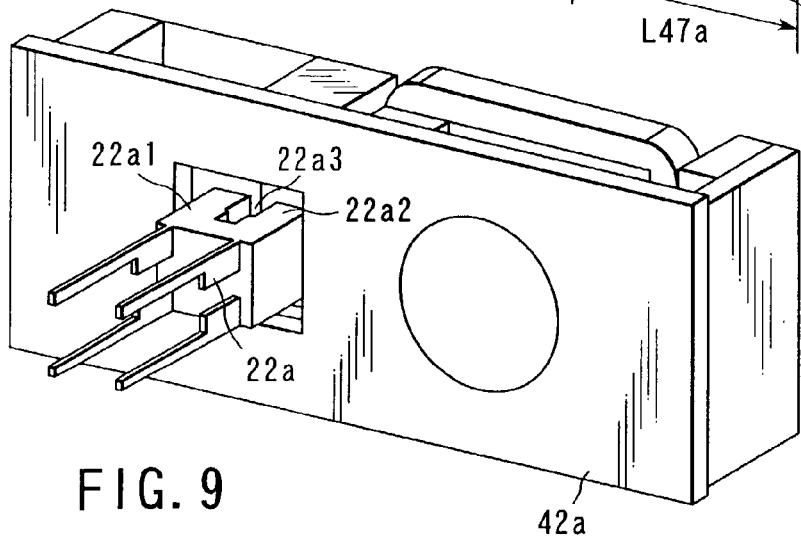
FIG. 9 is a perspective view useful in describing a position detecting device according to the first embodiment of the present invention.
Figure 10:
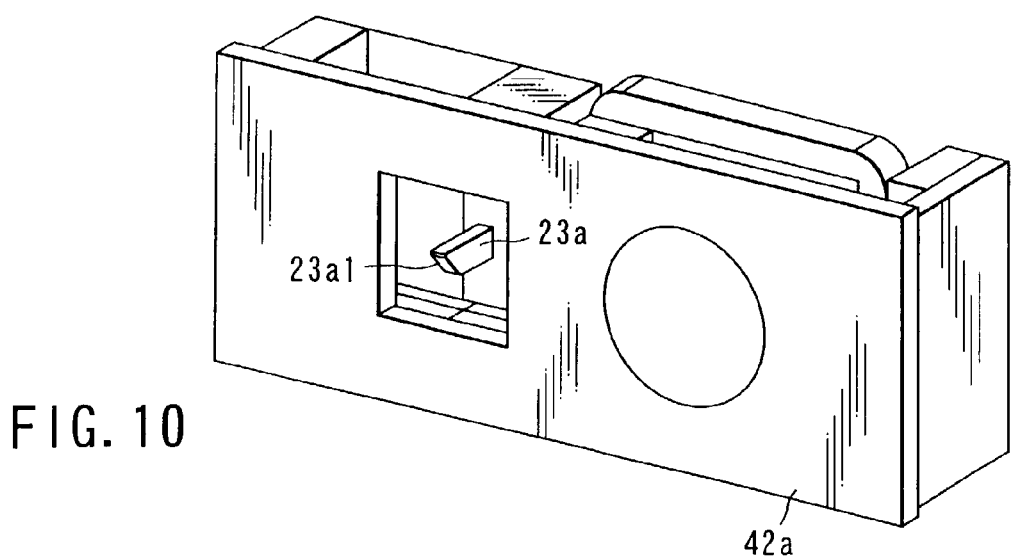
FIG. 10 is a perspective view useful in describing a baffle according to the first embodiment of the present invention.

Now, a position sensor in this embodiment will be described in detail. FIG. 9 is a perspective view showing the arrangement of the position detecting device 22a. FIG. 10 shows the shape and arrangement of a baffle. In this embodiment, the position detecting device 22a is used as a position sensor as described previously. Element incorporating sections 22a1 and 22a2 of the position detecting device 22a incorporate a light emitting element 34a and a light receiving element 35a. When no obstacle is present in a slit 22a3, light generated by the light emitting element 34a such as a light emitting diode is incident on the light receiving element 35a such as a photodiode. The light receiving element 35a provides a signal depending on the quantity of light received. Accordingly, when the baffle 23a is moved into or out from the slit 22a3, its position can be detected. The baffle 23a is attached to the lens holder 27a, thereby enabling the position of the lens holder 27a to be detected. If the position detecting device is small in size, it often provides small-sized effective beams and thus has a position detection range smaller than the range within which the lens holder 27a is to be positioned. Thus, in this embodiment, an oblique notch 23a1 is formed in the baffle 23a to reduce a variation in baffling effect caused by movement of the baffle 23a. As a result, the position detection range is sufficiently enlarged compared to the range within which the lens holder 27a is movable. Consequently, the control circuit can place the lens at any position on the basis of feedback control. Thus, the lens is not substantially affected by a vibration or shock as described previously.

This embodiment has such a structure that light from the light emitting element 34a is unlikely to be irregularly reflected by certain parts before impinging on the light receiving element 35a of the position detecting device 22a and that extraneous light is unlikely to fall on the light receiving element 35a. That is, position detecting device supporting pillars 41a and 41b are present in the Z direction as shown in FIG. 5, and the position detecting device itself and the lens holder 27a are present in the X direction. The position detecting device itself is also present in the Y direction. Accordingly, the slit 22a3 is surrounded by the baffling components to prevent unwanted light from being incident on the light receiving element 35a. Therefore, stable position detection can be achieved.

Further, the position detecting device 22a is arranged at a side of the mirror 6 as shown in FIG. 2. Although optical elements can be arranged at the opposite side the relay lens driving mechanism (in this embodiment, the optical elements 11 and 12 are arranged), no optical elements can be arranged in the area in which the position detecting device 22a is located. When the position detecting device 22a is arranged in this area, the space can be more efficiently used to provide a small-sized optical head.

The position sensor may be replaced with another non-contact type. For example, the position sensor may be composed of a magnet and a Hall element.

Figure 11:
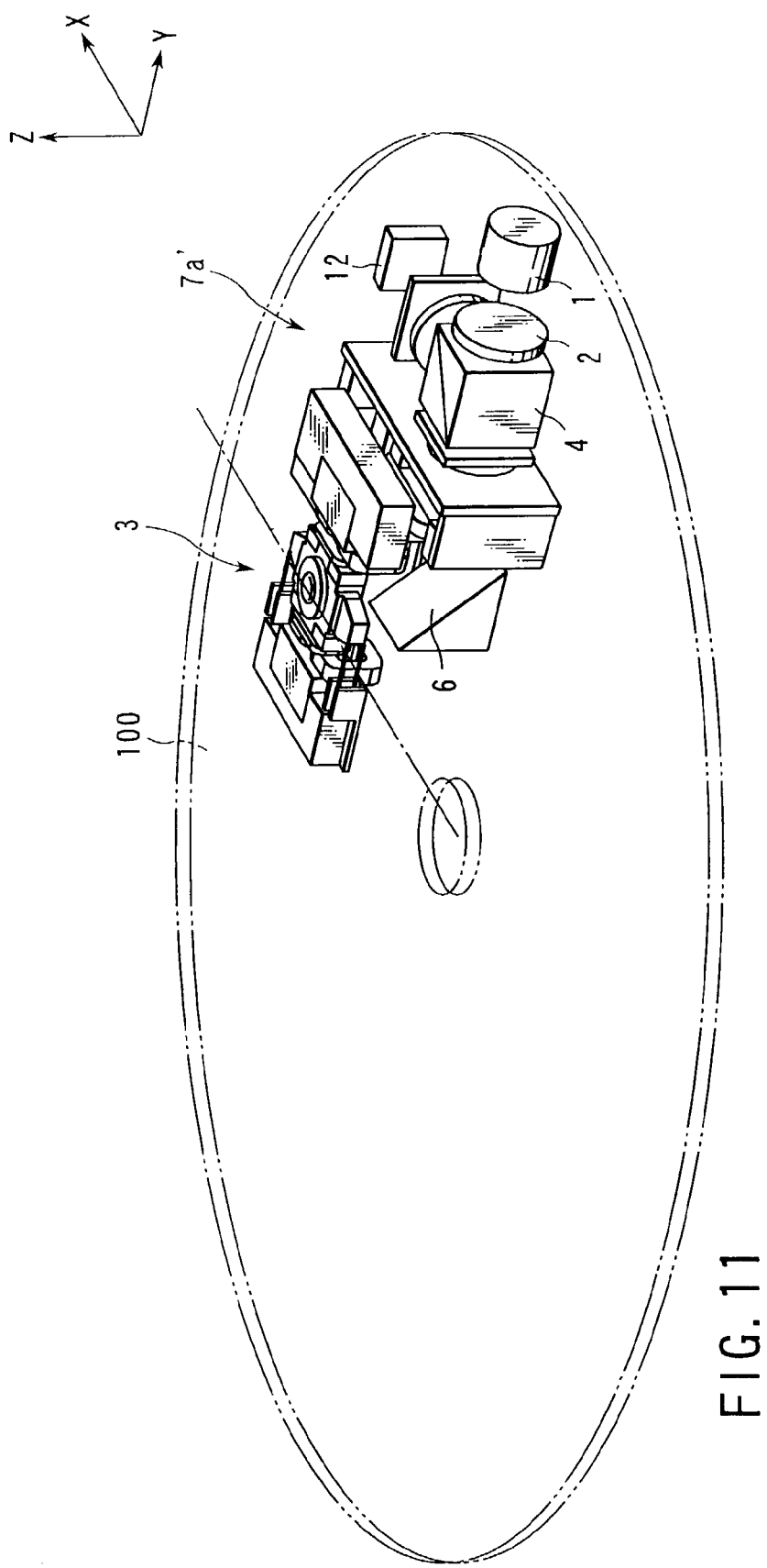
FIG. 11 is a perspective view showing a variation of the optical head according to the first embodiment of the present invention.
Figure 12:
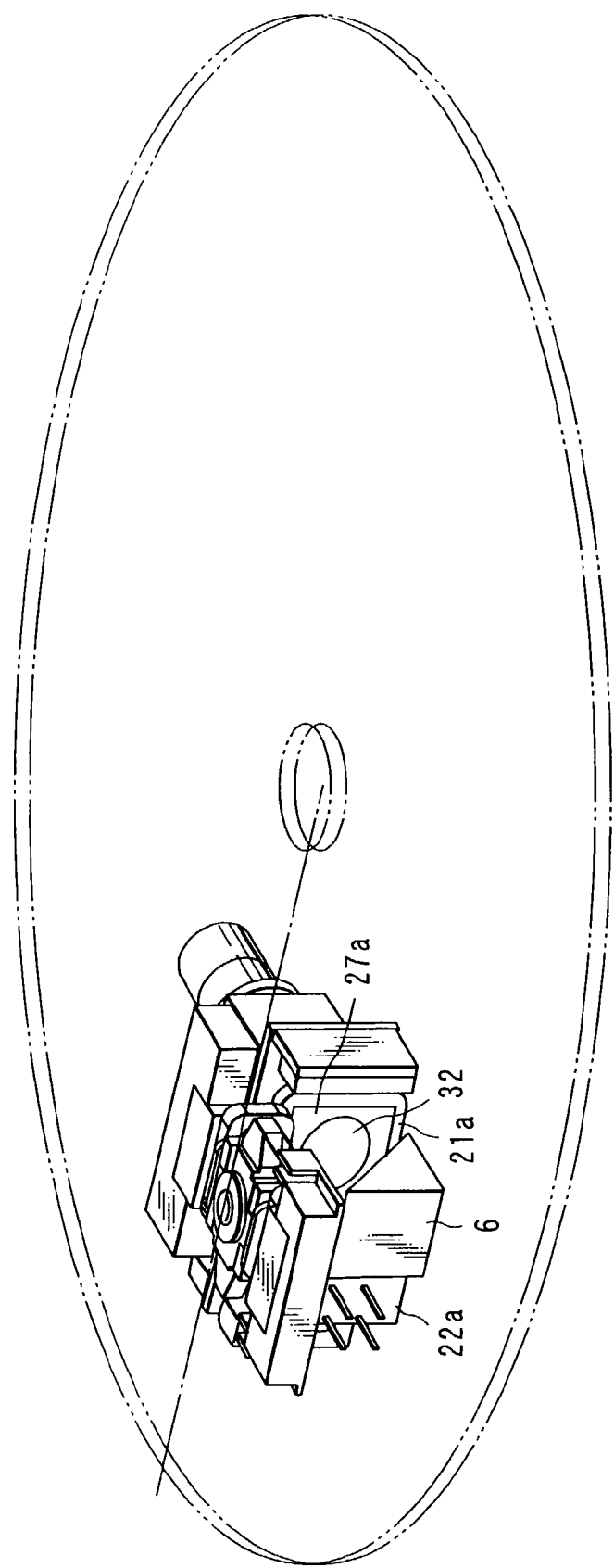
FIG. 12 is another perspective view showing the variation of the optical head according to the first embodiment of the present invention.

Now, a variation of the optical head according to the first element will be described. FIGS. 11 and 12 are perspective views schematically showing this variation. The configuration of this optical head is substantially the same as that of the first embodiment. Thus, parts with the same functions are denoted by the same reference numerals, and description thereof is omitted.

In this variation, compared to the first embodiment, the mirror 6 is oriented so that light traveling in a direction parallel to a tangent line of the disk is incident on the objective lens 8. Further, a relay lens driving mechanism 7a' is constructed to drive the lens 32, located closer to the objective lens 8. Even in this case, when the position detecting device 22a is arranged closer to the outer circumference of the disk than the mirror 6, the space can be more efficiently used to provide a small-sized optical head. That is, the optical head of the present invention can be provided regardless of the spherical aberration correcting lens to be moved or the orientation of the mirror 6.

Figure 13:
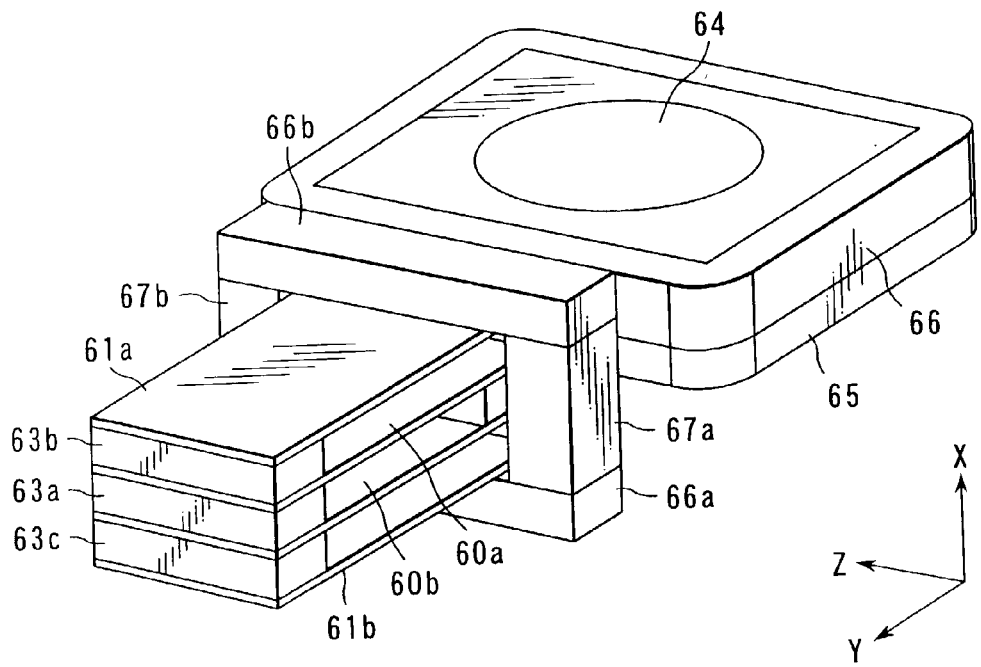
FIG. 13 is a perspective view showing a variation of a lens supporting mechanism used in the relay lens used in the relay lens driving mechanism according to the first embodiment of the present invention.
Figure 14:
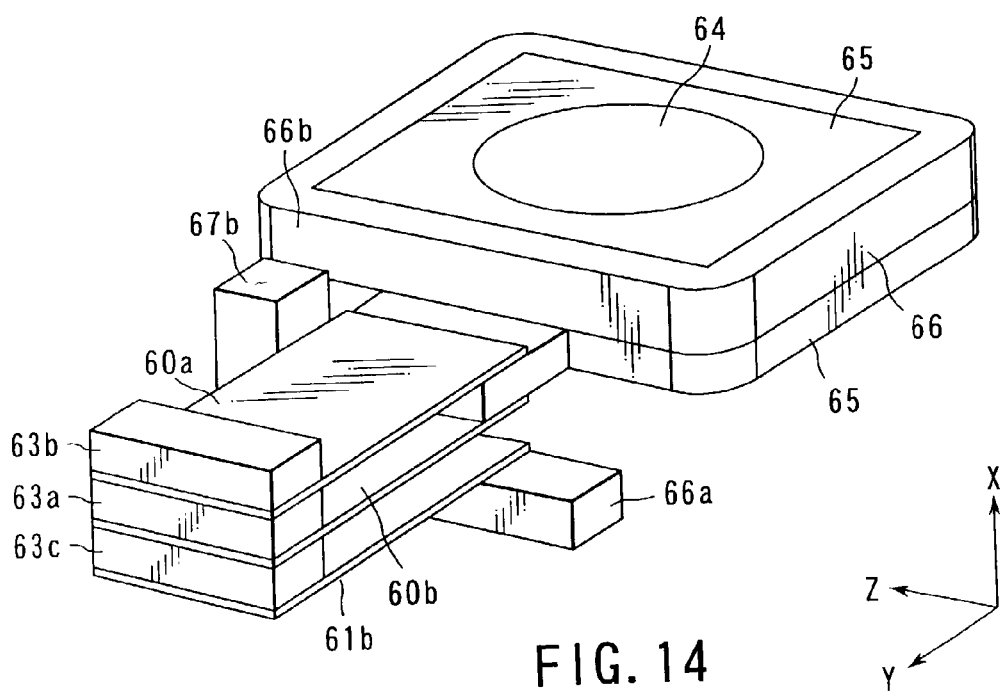
FIG. 14 is a perspective view of the lens supporting mechanism shown in FIG. 13 as partially omitted.

Next, a variation of a plate spring arrangement of the relay lens driving mechanism which can be used for the optical head of the present invention will be shown with reference to FIGS. 13 and 14. This arrangement has functions equivalent to those of the lens supporting mechanism composed of the plate springs according to the first embodiment.

A lens 64 is fixed to a lens holder 65. The lens holder 65 has a coil 66 mounted thereon in a direction in which the coil is wound around an optical axis of the lens 64. A permanent magnet (not shown) is provided so that when a current is conducted through the coil 66, force is generated in the vertical direction of the figures. The lens holder 65 is supported by two parallel plate springs 60a and 60b. The other ends of the plate springs 60a and 60b retain an appropriate interval between the plate springs via a spacer 63a. Furthermore, another set of two parallel plate springs 61a and 61b are connected to the lens holder via spacers 63b and 63c. In this case, the plate springs 60a and 60b and the plate springs 61a and 61b are attached to the spacers 63a, 63b, and 63c on the same side thereof. The other ends of the plate springs 61a and 61b are fixed to support beams 66a and 66b. Further, the support beams 66a and 66b are connected together using spacers 67a and 67b. Some or all of the support beams 66a and 66b and the spacers 67a and 67b are fixed to the base (not shown).

As described above, those portions of the four plate springs other than their fixed portions which function as plate springs all have the same length, thickness, and width. Here, it is assumed that a current is conducted through the coil 66 to generate force in the X direction of the figures. At this time, the spacers 63a, 63b, and 63c are displaced by a distance $\Delta X1$ in the X direction and by a distance $\Delta Y1$ in a $-Y$ direction. This is because the spacers are forced to move in the $-Y$ direction when displaced by the distance $\Delta X1$ because the length of the plate springs in the Y direction does not substantially change. Similarly, the plate springs 60a and 60b are flexed by a distance $\Delta X2$ in the X direction and by a distance $\Delta Y2$ in the Y direction. However, since the four plate springs have the same shape as described previously, the distance $\Delta X1$ equals the distance $\Delta X2$, whereas the distance $\Delta Y1$ equals the distance $\Delta Y2$. The spacer supporting the plate springs 61a and 61b is moved the distance $\Delta Y1$ in the $-Y$ direction. Consequently, even when the plate springs 60a and 60b is contracted by the distance $\Delta Y2$, i.e. the distance $\Delta Y1$ in the Y direction, the lens 64 is not moved in the Y direction but is only moved in the X direction by a distance $\Delta X1+\Delta X2=2\Delta X1$. That is, the optical axis of the lens 64 is prevented from deviating from the correct position thereof in spite of movement in the X direction. In this embodiment, the intervals between the four plate springs are equal, but they need not be equal. Further, the four plate springs need not necessarily have the same shape. Slight deviation of the optical axis may be permitted depending on optical conditions. Thus, the dimensions of the plate springs may be set to meet such conditions. That is, the lens supporting mechanism used for the optical head of this embodiment and composed of the plate springs has only to be such that two sets of plate springs are connected together in series and that the directions of the plate springs are reversed where they are connected together. In this case, the set of parallel plate springs may be constituted by two or more parallel plate springs operating in parallel.

In the above embodiment, the relay lens is composed of two lenses, but each of these lenses may be formed by sticking a plurality of lenses together. That is, if one or more lenses provided separately from the objective lens are moved in the direction of their optical axes to compensate for a spherical aberration resulting from a difference between the optical thickness of the substrate of the optical disk and an optical thickness set when the objective lens is designed, the optical head of the present invention is particularly effective if the lenses can be moved in the directions of their optical axes and the range within which the lenses can be inclined is very small.

Then, the features of the optical head according to the first embodiment will be described below in brief.

(1) An optical head according to the present invention comprises a lens to correct spherical aberrations, a lens holder which holds the lens, a first parallel plate springs which supports the lens holder at one end thereof, an intermediate member attached to the other end of the first parallel plate spring, a second parallel plate spring arranged to extend from the intermediate member to the lens holder to support the intermediate member at one end thereof, and a fixing member which fixes the other end of the second parallel plate spring. Thus, the lens is moved only in the direction of the optical axis passing through the lens, thereby preventing the positional deviation of the optical axis.

(2) In addition to the arrangements of (1), the optical head of the present invention comprises a coil mounted on the lens holder in a direction in which the coil is wound around the optical axis of the lens, and a permanent magnet provided opposite one end of the first parallel plate spring via the lens holder the coil so as to maintain a predetermined gap between the permanent magnet and the coil. That is, this configuration enables smooth electromagnetic driving compared to the use of a motor and gears.

(3) In addition to the arrangements of (1), the optical head of the present invention comprises a position sensor that detects a position of the lens holder. This enables the position of the lens holder to be detected and controlled, thereby avoiding the effects of a vibration or shock.

(4) In the optical head of the present invention configured as described in (3), the position sensor is composed of a light emitting element, a light receiving element, and a baffle provided in the lens holder. That is, the position sensor is of a non-contact type, so that no force is exerted on a movable part such as the lens holder. This prevents a forced variation in position of the lens, thereby preventing an increase in number of optical aberrations which increase is caused by the positional deviation of the spherical aberration correcting lens.

(5) In the optical head of the present invention configured as described in (4), a periphery of the tip portion of the baffle (baffling section) is not perpendicular to a direction in which the baffle is moved. If the light emitting and receiving elements are small in size, it provides small-sized effective beams. Consequently, the position detection range of the position sensor cannot cover the range within which the spherical aberration correcting lens is movable. However, the detection range can be enlarged by obliquely cutting the baffle. This serves to provide a small-sized optical head.

Further, as shown in FIG. 11, the optical head is configured so that the optical axis of the relay lens is perpendicular to the objective lens of the optical head and to the direction in which the optical head is moved (that is, the radial direction of the disk). Alternatively, the optical head is configured so that perpendiculars of plate springs supporting the relay lens are substantially perpendicular to the moving direction of the optical head and to the objective lens. This prevents the relay lens from being moved by inertia force effected on the relay lens as the optical head is moved in the radial direction of the optical head. Thus, the position of the lens can be retained even if the optical head fails in a seeking operation and collides against a stopper. Further, if the direction of the optical axis of the relay lens coincides with the moving direction of the optical head, when the optical head is moved in the radial direction, holding force must be generated which is as strong as the resulting inertia force and is directionally opposite thereto. However, the optical head configured as described above requires no such holding force and consumes less power.

Furthermore, the optical head is configured so that the arrangement and shape of the plate springs are symmetric with respect to a plane extending through the center of gravity of the movable part perpendicularly to the optical axis and to a plane containing the optical axis and the direction in which the plate springs are supported. If the center of gravity of the movable part deviates from the center of the interval between the two plate springs, then moment force is generated as the optical head is moved, resulting in inclination. However, the plate springs have the weakest torsional rigidity around their supporting direction. Accordingly, the moment force can be avoided to reduce possible inclination while the optical head is being moved.

Now, a second embodiment of the invention will be described.

Figure 15:
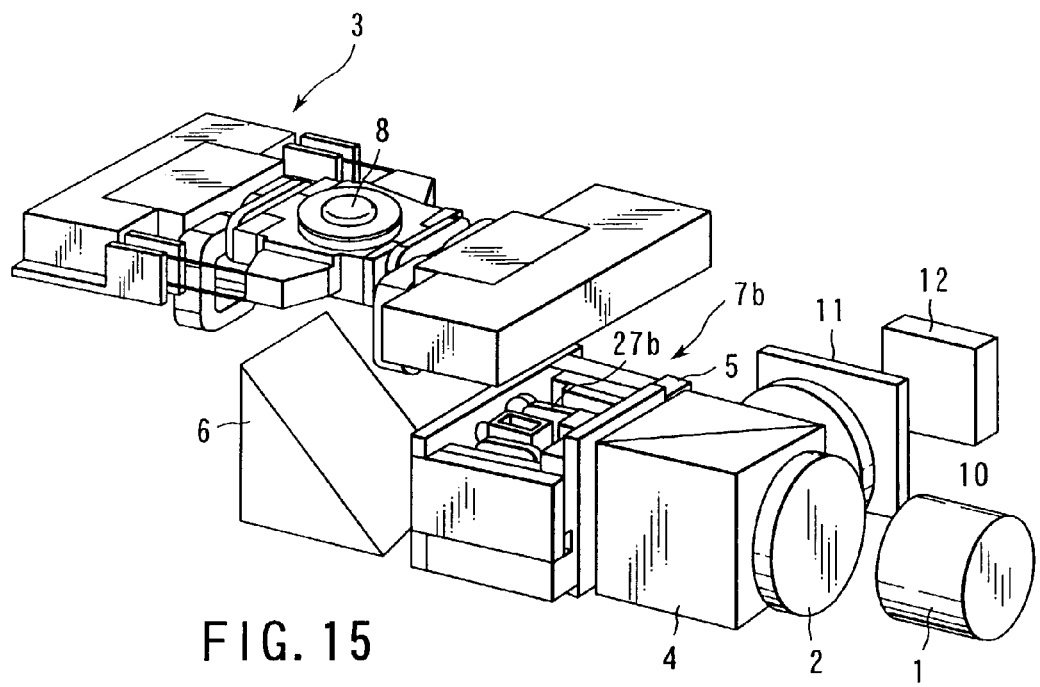
FIG. 15 is a diagram showing the structure of a main part of an optical head according to a second embodiment of the present invention.
Figure 16:
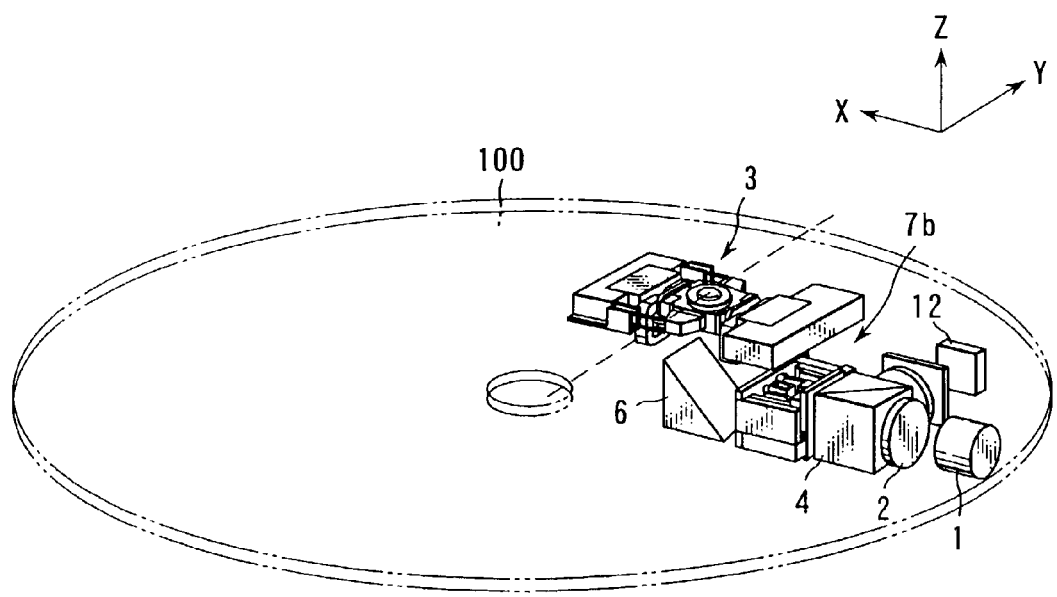
FIG. 16 is a perspective view showing the positional relationship between the optical head and an optical disk in FIG. 15.
Figure 17:
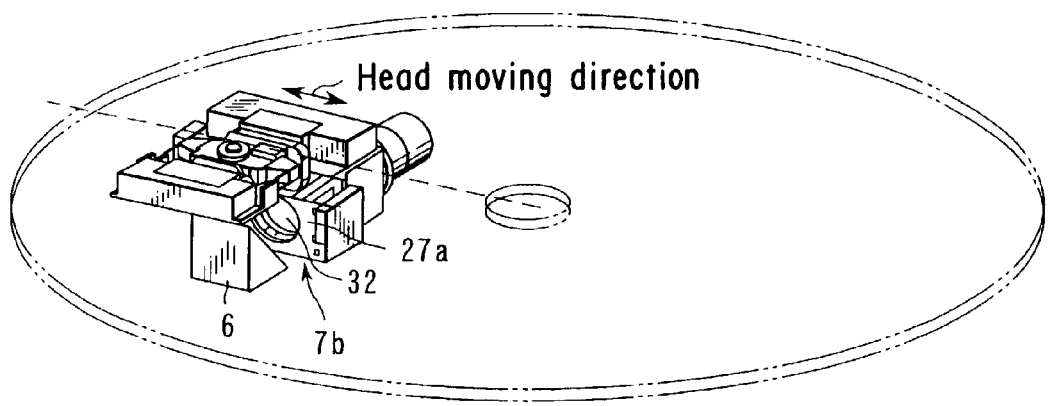
FIG. 17 is another perspective view showing the positional relationship between the optical head and optical disk in FIG. 15.

FIG. 15 is a perspective view showing the structure of a main part of an optical head according to the second embodiment. FIGS. 16 and 17 are perspective views showing the positional relationship between an optical disk and the optical head. In FIG. 15, a light beam emitted by the light source 1 is collimated by the collimator lens 2. The beam is then incident on the beam splitter 4 and subsequently passes through the quarter wavelength plate 5. Then, the light beam propagates through the relay lens system in a relay lens driving mechanism 7b according to this embodiment. The beam then has its orientation changed by 90° by the mirror 6 and then impinges the optical disk 100 via the objective lens 8. Reflected light from the disk 100 passes through the objective lens 8 and is then reflected by the mirror 6. The light then propagates through the relay lens system and the quarter wavelength plate 5 and impinges on the beam splitter 4. Then, the light is reflected by the beam splitter 4 and condensed by the convex lens 10. Then, the light beam passes through the focus error signal generating element 11 and is applied to the photodetector 12.

Figure 18:
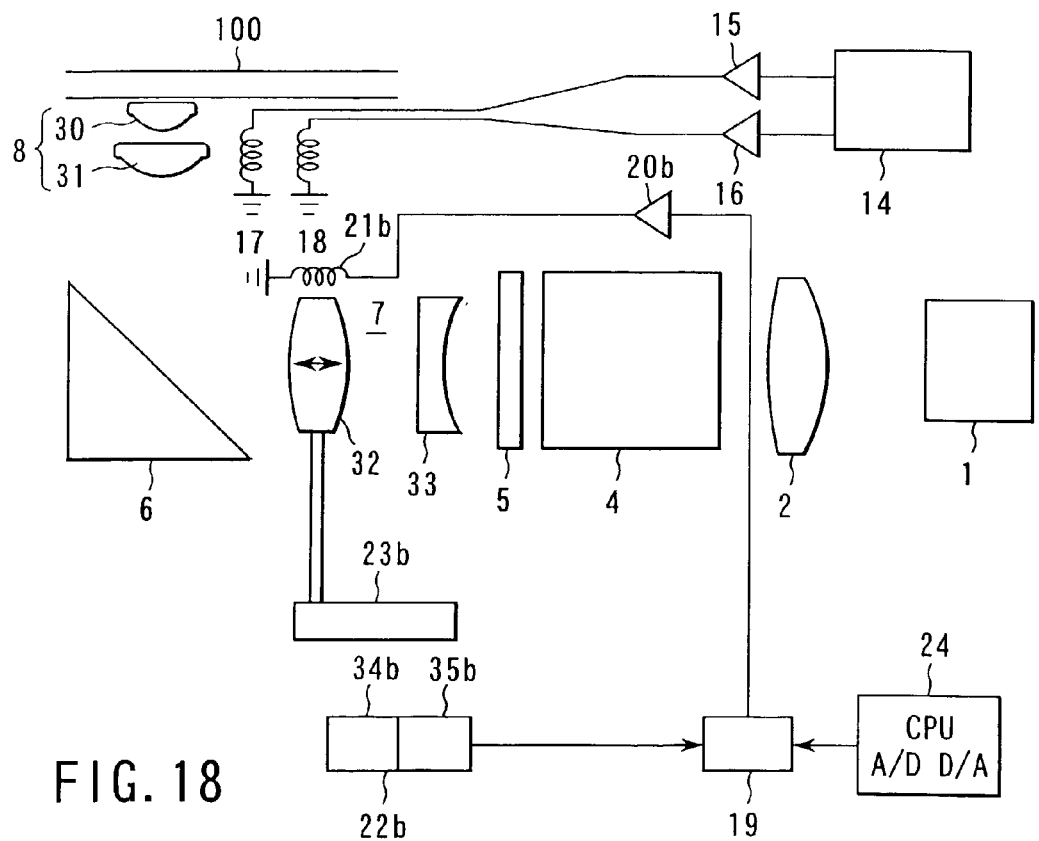
FIG. 18 is a schematic diagram showing the configuration and operation of the optical head in FIG. 15.

An output from the photodetector 12 is input to the arithmetic circuit 13 as described previously to obtain an information reproduction signal, a focus error signal, and a tracking error signal. The focus error signal and the tracking error signal have their phases compensated for by the phase compensation circuit 14. On the basis of a phase compensation signal from the phase compensation circuit 14, the actuator drivers 15 and 16 conduct currents through the coils 17 and 18 of the objective lens driving device 3, as shown in FIG. 18. This controls the positions of the objective lens 8 in the direction of the optical axis and in the radial direction.

The relay lens system 7 is used to correct a spherical aberration that may be caused by an error in the thickness of the cover layer of the disk 100. At least either the lens 32 or lens 33 (in this embodiment, 32) is moved in the direction of its optical axis to cause a spherical aberration in the relay lens system in the relay lens driving mechanism 7b so as to correct a spherical aberration caused by an error in the thickness of the cover layer of the disk 100. In this case, a position detecting device 22b is provided to detect the position of the relay lens 32.

The position detecting device 22b is a reflection photosensor composed of a light emitting diode 34a and a photodetector 35b. Light from the light emitting element 34b is reflected by a reflecting plate 23b (preferably a white plate, which diffusively reflects light) that moves together with the relay lens 32. The light is then incident on the photodetector 35b. The amount (area) of that part of the reflecting plate 23b which is opposite to the position detecting device 22b varies with the position of the relay lens 32. This correspondingly varies the quantity of light reflected or light incident on the photodetector 35b. Consequently, the position of the relay lens 32 can be detected. Then, an output from the photodetector 35b is input to a lens position control circuit 19b. The lens position control circuit 19b outputs a correction signal to a drive circuit 20b so as to place the relay lens at a specified position input by the CPU 24. The drive circuit 20b conducts a current corresponding to the correction signal, through a coil 21b of the relay lens driving mechanism 7b. Thus, also in this embodiment, position control is executed on the basis of feedback control.

As described previously, the CPU 24, provided with the A/D and D/A, causes the relay lens control circuit 19b to gradually move the position of the relay lens 32 to the extent that a spherical aberration in an expected substrate thickness can be corrected. Then, a position of the lens 32 at which a reproduction information signal has the largest amplitude is detected. Subsequently, the corresponding value is continuously output to the relay lens position control circuit 19b. In this manner, position control is executed on the basis of feedback control instead of open control as in the prior art. Accordingly, the position of the relay lens is not affected by a vibration or shock, thereby precisely achieving detection of the maximum value of the reproduction information signal and the subsequent retention of the lens position.

Next, the relay lens driving mechanism 7b, mounted in the optical head of this embodiment, will be described in detail. In this case, of the two lenses constituting the relay lens, the lens 32 is movable, whereas the lens 33 is fixed.

Figure 19:
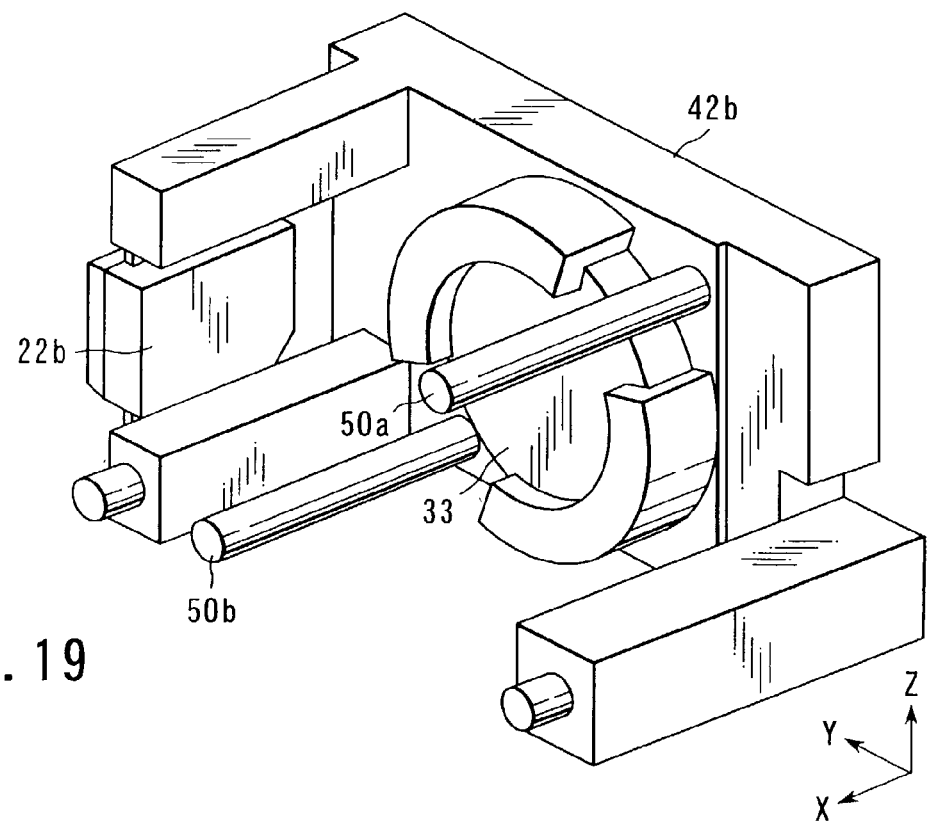
FIG. 19 is a perspective view partially showing the configuration of a relay lens driving mechanism according to the second embodiment of the present invention.
Figure 20:
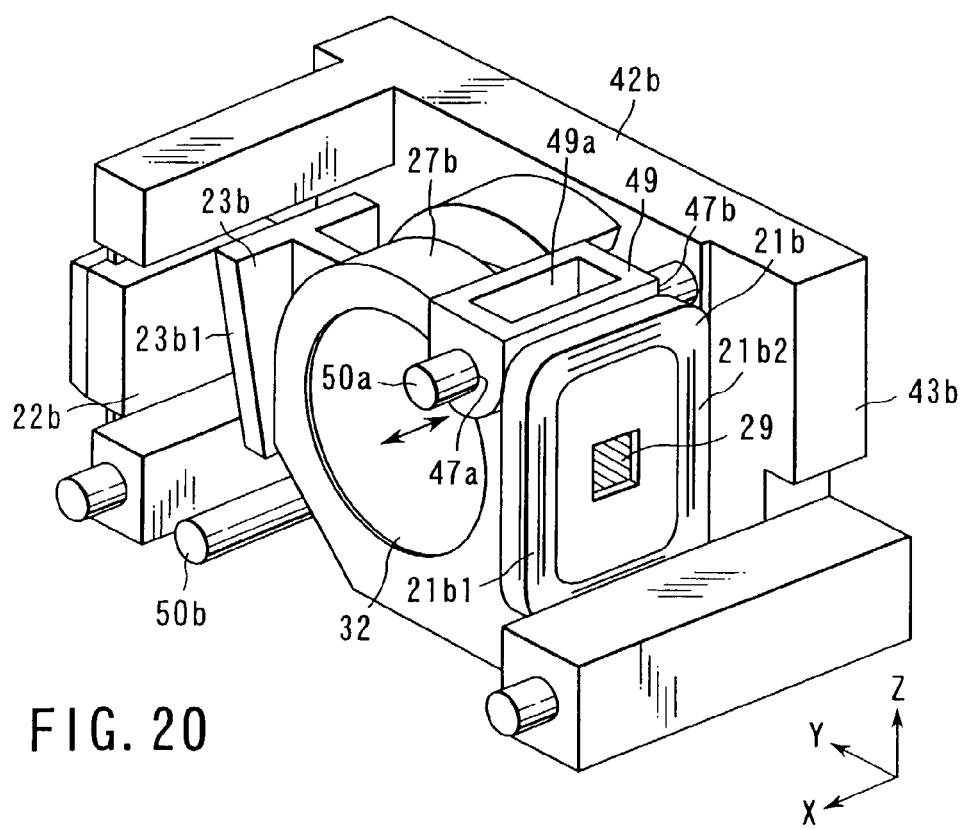
FIG. 20 is another perspective view partially showing the configuration of the relay lens driving mechanism according to the second embodiment of the present invention.

As shown in FIG. 19, the lens 33 is mounted in a base 42b. The movable lens 32 is mounted in the lens holder 27b as shown in FIG. 20. The lens holder 27b has the coil 21b mounted thereon and wound around an winding axis (Y direction) perpendicular to the optical axis (X direction) of the lens 32. The winding axis for the coil is perpendicular to the optical axis, thereby allowing the size of the apparatus to be reduced.

Figure 21:
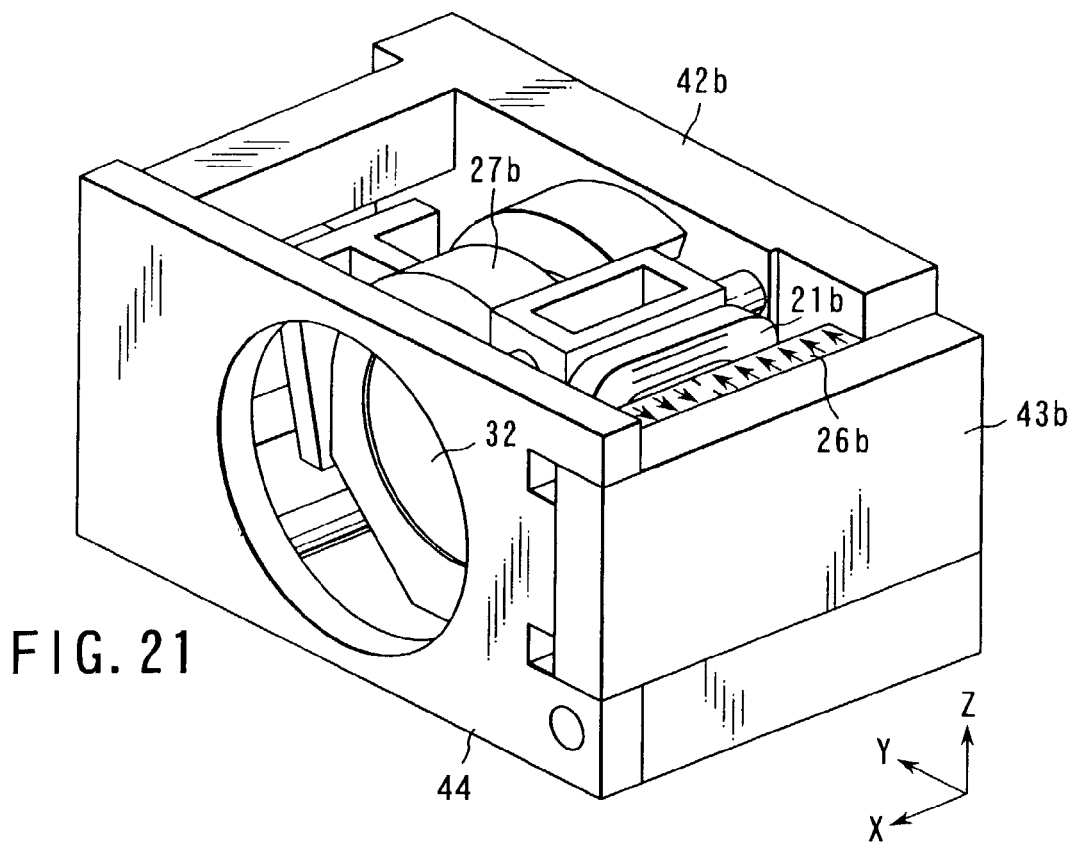
FIG. 21 is a perspective view showing the configuration of the relay lens driving mechanism according to the second embodiment of the present invention.

As shown in FIG. 21, a permanent magnet 26b is mounted on a yoke 43b consisting of a ferromagnetic material such as a steel plate. The yoke 43b is attached to a base 42b. Accordingly, the permanent magnet 26b is fixed to the base 42b. The permanent magnet 26b is slightly separate from the coil 21b. The permanent magnet 26b is of a bipolar type magnetized in directions that are parallel with the winding axis for the coil 21b but opposite to each other around a substantially central position of the magnet in the direction of the optical axis of the lens 32, as shown by the arrow in FIG. 21. This bipolar magnetized structure serves to increase efficiency, while reducing power consumption. Similar effects are produced by combining two unipolar magnets.

The coil 21b has two straight portions corresponding to the respective magnetic poles of the permanent magnet 26b and extending in the direction of the optical axis of the lens 32 and perpendicularly to the winding axis for the coil 21b, respectively, as shown at 21b1 and 21b2 in FIG. 20. The lens holder 27b is supported by two parallel guide rails 50a and 50b parallel with the direction of the optical axis of the lens 32. The guide rails 50a and 50b are supported by a base 42b and a sub-base 44 fixed to the base 42b, as shown in FIG. 21.

The lens holder 27b is provided with a rail receiving section 49 as a bearing section which has a cavity 49a, and the rail receiving section 49 is provided with coaxial holes 47a and 47b, as shown in FIG. 20. A guide rail 50a penetrates the holes 47a and 47b while maintaining a small gap therein which is sufficient to allow the lens holder 27b to slide. The cavity 49a in the rail receiving section 49 is provided so that the holes 47a and 47b, which contacts with the guide rail 50a, are as far from each other as possible in the X direction of the rail receiving section 49. This is effective in improving the accuracy of the orientation of the lens holder.

Figure 22:
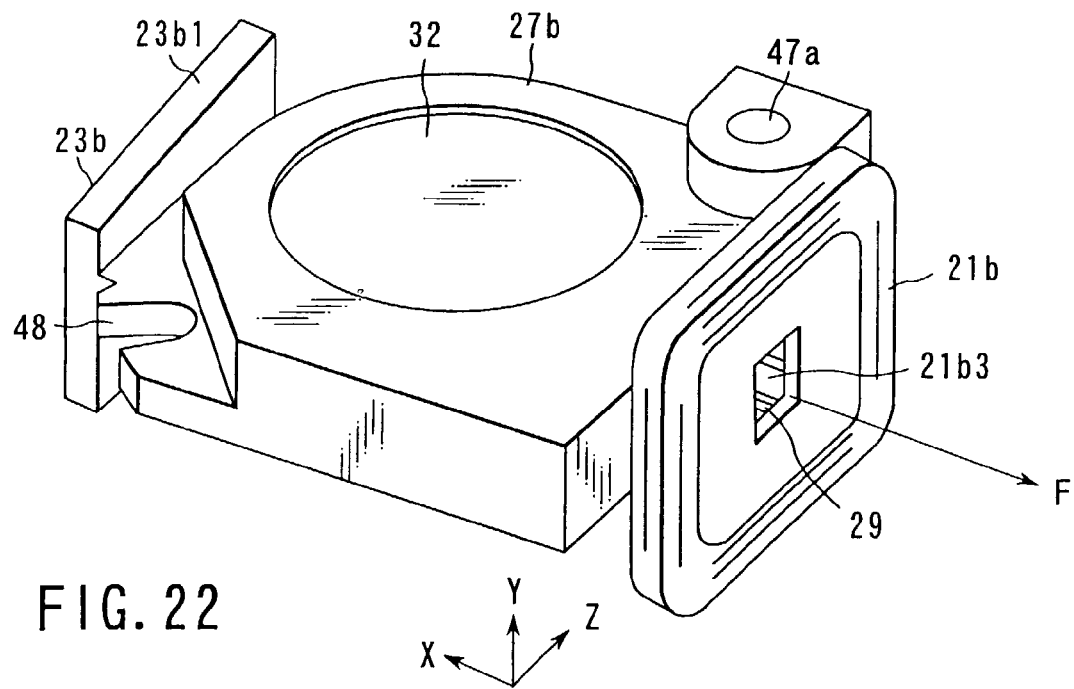
FIG. 22 is a perspective view showing the configuration of a movable part of the relay lens driving mechanism according to the second embodiment of the present invention.

As shown in FIG. 22, the lens holder 27b is provided with a U-shaped notch 48 slidably penetrated by the guide rail 50b. The holes 47a and 47b and the U-shaped notch 48 are preferably formed of material having a small friction coefficient such as that having a PPS-equivalent lubrication grade. The surfaces of the guide rails 59a and 50b may be coated with a lubricant such as grease.

Furthermore, the lens holder 27b has a small iron piece 29 (a shaded portion in the figure) set therein close to the center of the coil and composed of a ferromagnetic material such as a silicon steel plate. The permanent magnet generates force F in the direction of the wiring axis for the coil. The small iron piece 29 and the permanent magnet 26b operate as pressing means for pressing the rail receiving section 49 against the guide rail.

Figure 23:
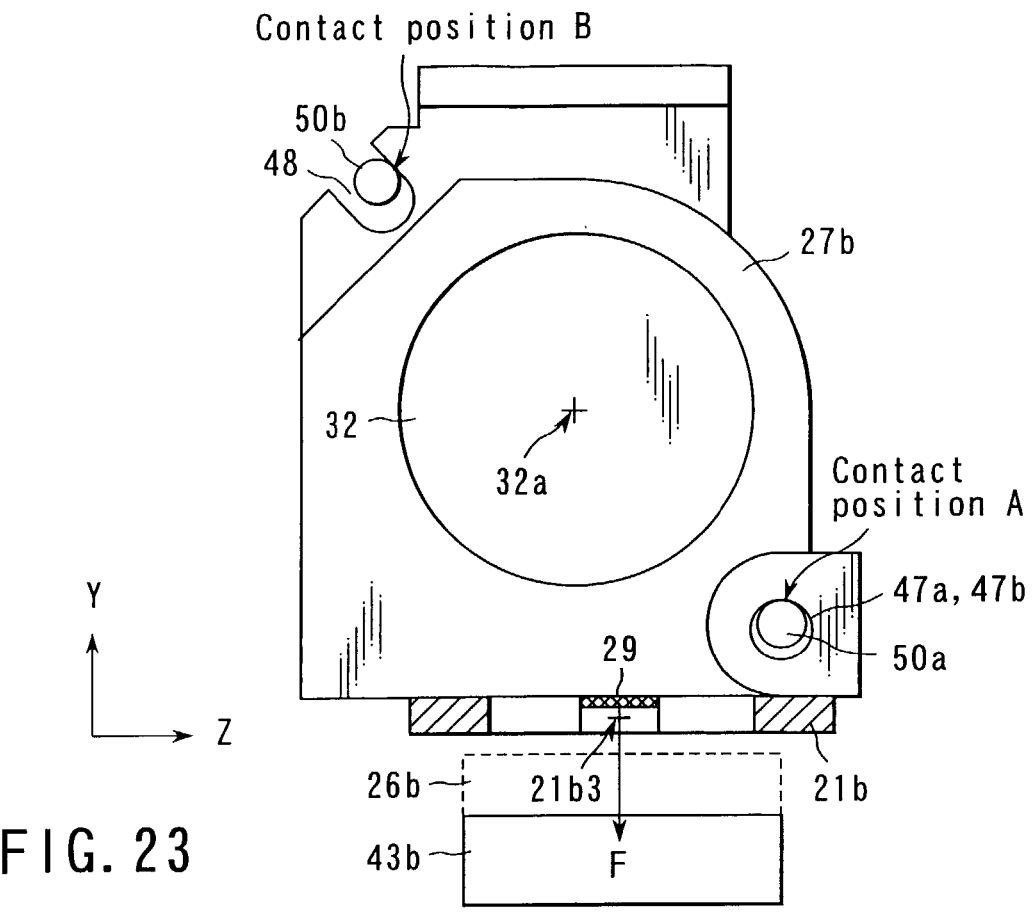
FIG. 23 is a plan view showing the configuration of the movable part of the relay lens driving mechanism according to the second embodiment of the present invention.

FIG. 23 is a plan view showing a movable part of the relay lens driving mechanism. The winding axis for the coil 21b lies at predetermined angle from a plane containing the centers of the guide rails 50a and 50b. A line, which extends from the small iron piece 29 in a direction perpendicular to the plane containing the centers of the guide rails 50a and 59b, crosses this plane at a point between the guide rails 50a and 50b.

These components are arranged in the Z direction in the following order:

Holes 47a and 47b>center of driving force acting on the coil 21b=center of the iron piece 29≧optical axis 32a of the lens 32>U-shaped notch 48

The above order causes the lens holder to be pressed against the guide rails 50a and 50b in the direction of the winding axis for the coil. This stabilizes a position A at which the guide rail 50a contacts with the holes 47a and 47b and a position B at which the guide rail 50b contacts with the U-shaped notch 48. As a result, the position of the lens holder 27b is stabilized to suppress inclination and deviation of the optical axis of the lens 32. Therefore, optical aberrations are restrained.

If light is projected on an XY plane, the distance between the guide rail 50a and the center of driving force generated in the coil can be reduced by positioning a central position 21b3 of the coil 21b closer to the guide rail 50a or arranging the winding axis for the coil 21b in the Y direction. This suppresses moment force that may be generated in the lens holder 27b to act on the guide rail 50a. This moment force presses the holes 47a and 47b against the guide rail 50a, thereby generating frictional force in the X direction. If the frictional force exceeds the driving force generated in the coil 21b, the lens 32 cannot be moved. Then, what is called a "pinch" phenomenon may occur. The term "pinch" as used herein refers to inclination of the center axes of the holes 47a and 47b caused by the moment force or hard-pressing of the periphery of the hole 47a or 47b against the guide rail 50a, with the result that the lens 32 cannot be moved. In this embodiment, smaller moment force serves to prevents the holes 47a and 47b from pinching the guide rail 50a, thereby preventing the lens from becoming inoperative.

Furthermore, if light is projected on an XZ plane, frictional force generated between the guide rail 50b and the U-shaped notch 48 constitutes moment force acting in a direction opposite to that of force generated by the coil 21b. This reduces the possibility of the pinch phenomenon. It should be appreciated that effective measures for preventing the pinch phenomenon include maximizing the distance of the holes 47a and 47b in the X direction or reducing the friction coefficient of the guide rails 50a and 50b.

In this embodiment, the guide rail 50a slides through the holes 47a and 47b. However, if the lens holder 27b and the guide rail 50a are secured to each other so that the guide rail 50a can slide along the base 42a and the guide rail 50a can slide through the hole in the sub-base 44, frictional force can be reduced which results from moment force generated by the coil 21b.

The operation of the relay lens driving mechanism configured as described above will be descried with reference to FIGS. 21 and 22. When a current is conducted through the coil 21*b*, it passes through a magnetic field generated by the permanent magnet 26*b*. Consequently, Lorentz force is generated in the coil 21*b*. In particular, the force generated in the portions 21*b*1 and 20*b*2 of the coil is exerted on the lens holder 27*b* in the direction of the optical axis of the lens 32. Since the lens holder 27*b* is slidably supported by the guide rails 50*a* and 50*b*, the lens holder 27*b* is moved in the direction of the optical axis. In this case, the guide rails 50*a* and 50*b* are assembled parallel with the optical axis of the lens 32, and force is exerted between the small iron piece 39 and the permanent magnet 26*b*. Accordingly, even when the lens holder is moved in the direction of the optical axis, the lens 32 is not inclined or the optical axis thereof does not deviate from its correct position. As described previously, the small iron piece 29 and the permanent magnet 26*b* act as pressing means for pressing the rail receiving section 49 against the guide rail.

With the relay lens driving mechanism configured as described above, when the lens 32 is moved, it is displaced only in the direction of the optical axis to enable spherical aberrations to be appropriately corrected. Further, the lens is supported by the two guide rails, and force is exerted between the small iron piece 29 and the permanent magnet 26*b*. This provides high supporting rigidity to prevent the lens from being inclined by a shock or vibration.

Further, as described previously, effective driving force is generated in the two straight portions 21*b*1 and 21*b*2 of the coil. Therefore, an optical head can be provided which allows an actuator to operate efficiently, which consumes less power, and which generates less heat.

The supporting rigidity in the X direction is provided by a magnetic spring effect attributed to force generated between the small iron piece 29 and the permanent magnet 26*b* in the direction in which the small iron piece 29 approaches the position at which the permanent magnet is divided into the two poles.

Now, the position detecting device 22*b* in this embodiment will be described in detail. In this embodiment, the position sensor is a reflection photosensor as described previously. A smaller photosensor must be used in order to reduce the size of the optical head. However, a small-sized reflection photosensor provides small-sized effective beams and thus has a position detection range smaller than the range within which the lens holder 27*b* is to be positioned. Thus, in this embodiment, edges of the baffle 23*b* which otherwise extend perpendicularly to the moving direction of the lens holder are inclined as shown at 23*b*1 in FIG. 20. This reduces a variation in area of the reflecting plate 23*b*, located opposite the position sensor 22*b*, the variation associated with movement of the lens holder 27*b*. As a result, the position detection range is sufficiently enlarged compared to the range within which the lens holder 27*b* is movable. Consequently, the control circuit can place the lens at any position on the basis of feedback control. Thus, the lens is not substantially affected by a vibration or shock as described previously. Further, since the position sensor is of a non-contact type, no force is exerted on the movable part such as the lens holder. This hinders a forced variation in position of the spherical aberration correcting lens and prevents an increase in number of optical aberrations which increase is caused by the positional deviation of the spherical aberration correcting lens. Furthermore, the position sensor may be of another non-contact type composed of a magnet and a Hall element as in the first embodiment.

Next, the direction in which the optical head and the relay lens 32 are moved will be described. In this embodiment, as shown in FIGS. 16 and 17, the moving direction of the relay lens 32 coincides with the circumferential direction of the disk. The optical disk reads information from various radial positions thereon by moving in the radial direction. However, as the optical disk is moved, acceleration occurs to exert inertia force on the relay lens moving section. In this embodiment, the movable part of the relay lens driving mechanism 7*b* is moved in the circumferential direction of the disk instead of the radial direction thereof. This prevents the position of the movable part from being varied by the inertia force exerted thereon. Further, it becomes unnecessary to cause the coil 21*b* to generate holding force corresponding to the inertia force. As a result, power consumption can be reduced.

In order to move the optical head in the radial direction, high power must be supplied to an actuator that moves the optical head. Accordingly, if the power consumption of the relay lens driving mechanism 7*b* does not increase while the optical lens is moving, the peak power consumption of an optical disk drive apparatus or the like in which the optical head is mounted can be effectively reduced. The reduced power consumption contributes to miniaturizing a power circuit that supplies power.

Figure 24:
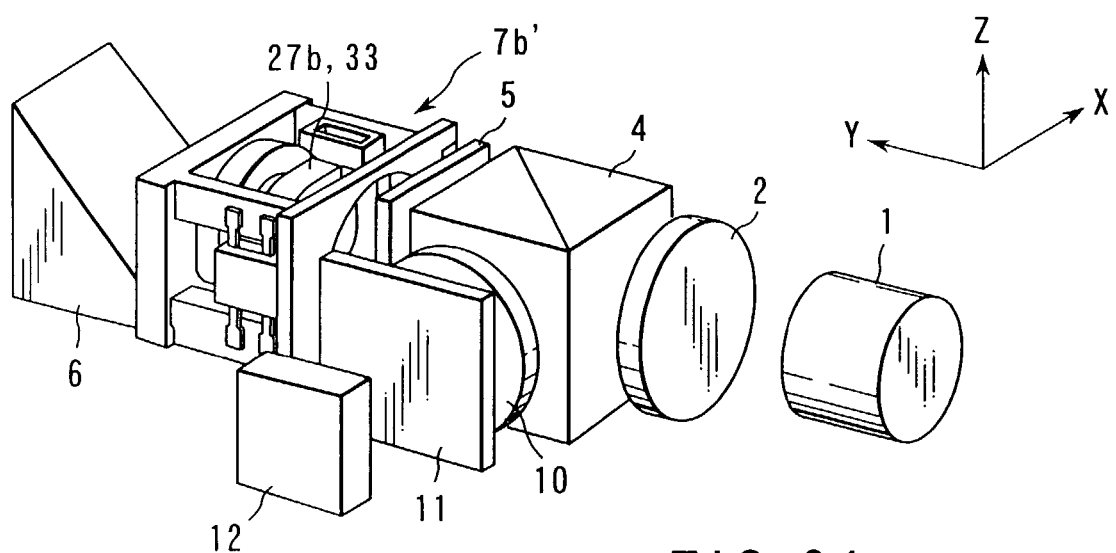
FIG. 24 is a diagram schematically showing the configuration of a variation of the optical head according to the second embodiment of the present invention.

FIG. 24 schematically shows the configuration of a variation of the optical head according to the second embodiment. A relay lens driving mechanism 7*b*', shown in FIG. 24, is obtained by rotating the components of the relay lens driving mechanism 7*b* described previously, through 180°. That is, the relay lens driving mechanism is configured so that the lens holder 27*b* for the movable lens is located closer to the light source 1 than the fixed lens. Furthermore, instead of the lens 32, the lens 33 is used as the movable lens. By thus moving one of the two relay lenses which is located further from the objective lens, a variation in quantity of light associated with movement of the lens is often reduced to provide good optical characteristics.

In the above embodiment, the relay lens is composed of two lenses, but each of these lenses may be formed by sticking a plurality of lenses together. That is, if one or more lenses provided separately from the objective lens are moved in the direction of their optical axes to compensate for a spherical aberration resulting from a difference between the optical thickness of the substrate of the optical disk and an optical thickness set when the objective lens is designed, the optical head of the present invention is particularly effective if the lenses can be moved only in the direction of the optical axis and the range within which the lenses can be inclined is very small.

Further, in the above embodiment, the magnet is magnetized to have two poles. However, equivalent effects are produced by combining two unipolar magnets. Furthermore, only one unipolar magnet may be used to generate force in only one of the straight portions 21*b*1 and 21*b*2 of the coil, through the power consumption may increase. Also in this case, the magnetic spring effect described previously is produced.

The present invention is not limited to the above embodiments. For implementations, many variations may be made to the embodiments without deviating from the spirits of the invention. Further, embodiments may be properly combined together, and the combinations may produce further effects. Furthermore, the above embodiments include various levels of inventions, and various inventions can be extracted by properly combining the plurality of disclosed configuration requirements. For example, if the effects described herein are still obtained after omitting some of the configuration requirements shown in the embodiments, then the configuration obtained by omitting the requirements can be extracted as an embodiment of the invention.

What is claimed is:

1. An optical head comprising:
    a lens to correct spherical aberrations;
    a lens holder holding the lens;
    a first parallel plate spring supporting the lens holder at one end thereof;
    an intermediate member attached to the other end of the first parallel plate spring;
    a second parallel plate spring arranged to extend from the intermediate member to the lens holder to support the intermediate member at one end thereof; and
    a fixing member fixing the other end of the second parallel plate spring.

2. An optical head according to claim 1, further comprising:
    a coil mounted on the lens holder in a direction in which the coil is wound around the optical axis of the lens; and
    a permanent magnet arranged such that the lens holder is interposed between the permanent magnet and the one end of the first parallel plate spring and a predetermined gap is maintained between the permanent magnet and the coil.

3. An optical head according to claim 1, further comprising a position sensor detecting a position of the lens holder.

4. An optical head according to claim 3, wherein the position sensor comprises a light emitting element, a light receiving element, and a baffle provided in the lens holder.

5. An optical head according to claim 4, wherein light traveling from the light emitting element into the light receiving element is blocked by a tip portion of the baffle, and a periphery of the tip portion is not perpendicular to a direction in which the baffle is moved.

6. An optical disk apparatus including an optical head that irradiates an optical disk with a light beam, the optical disk apparatus comprising:
    a lens to correct spherical aberrations;
    a lens holder holding the lens;
    a first parallel plate spring supporting the lens holder at one end thereof;
    an intermediate member attached to the other end of the first parallel plate spring;
    a second parallel plate spring arranged to extend from the intermediate member to the lens holder to support the intermediate member at one end thereof;
    a fixing member fixing the other end of the second parallel plate spring; and
    a lens moving section moving the lens in a direction of an optical axis.

* * * * *